United States Patent
Feng et al.

(10) Patent No.: US 10,872,390 B2
(45) Date of Patent: Dec. 22, 2020

(54) DEALER AND GAMING APPARATUS CONTROL SYSTEM FOR GAMING ESTABLISHMENTS

(71) Applicant: Empire Technological Group Limited, Las Vegas, NV (US)

(72) Inventors: Frank Feng, Las Vegas, NV (US); Daryn Kiely, Henderson, NV (US)

(73) Assignee: Empire Technological Group Limited, Las Vegas, NV (US)

( * ) Notice: Subject to any disclaimer, the term of this patent is extended or adjusted under 35 U.S.C. 154(b) by 572 days.

(21) Appl. No.: 15/396,342

(22) Filed: Dec. 30, 2016

(65) Prior Publication Data

US 2018/0189921 A1   Jul. 5, 2018

(51) Int. Cl.
G06Q 50/34 (2012.01)
G07F 17/32 (2006.01)
G06Q 10/10 (2012.01)

(52) U.S. Cl.
CPC ......... *G06Q 50/34* (2013.01); *G06Q 10/1097* (2013.01); *G07F 17/3241* (2013.01); *G07F 17/3288* (2013.01)

(58) Field of Classification Search
None
See application file for complete search history.

(56) References Cited

U.S. PATENT DOCUMENTS

| | | |
|---|---|---|
| 4,814,589 A | 3/1989 | Storch |
| 5,510,081 A | 4/1996 | Edwards et al. |
| 5,735,742 A | 4/1998 | French |
| D424,068 S | 5/2000 | Takemasa |
| 6,425,817 B1 | 7/2002 | Momemy |
| 6,464,584 B2 | 10/2002 | Oliver |
| 6,530,836 B2 | 3/2003 | Soltys et al. |
| D518,213 S | 3/2006 | Ping |

(Continued)

FOREIGN PATENT DOCUMENTS

WO   WO 2017/203142 A1   11/2017

OTHER PUBLICATIONS

Matthew Bunn et al., Preventing Insider Theft: Lessons from the Casino and Pharmaceutical Industries, 4 Journal of Nuclear Materials Management Spring 2013, vol. XLI, No. 3 (Year: 2013).*

(Continued)

*Primary Examiner* — Christine M Behncke
*Assistant Examiner* — Matthew H Divelbiss

(57) ABSTRACT

Embodiments disclosed herein concern dealer control for gaming establishments, such as casinos. Using an electronic management system, authentication and authorization of dealers can be provided in a controlled manner that complies with predetermined rules. The predetermined rules can implement business or governmental restrictions on dealers, gaming apparatus or gaming. Gaming devices that are operated by dealers can also be controlled by an electronic management system. Through such electronic control, gaming apparatus can be controlled to be placed in a locked or unlocked condition. The electronic control system can also provide or facilitate monitoring of dealer status and actions and/or gaming apparatus status and events. Further, the electronic control system can provide notification, such as alerts, to dealers, managers and/or players.

20 Claims, 18 Drawing Sheets

(56) References Cited

U.S. PATENT DOCUMENTS

| | | |
|---|---|---|
| 7,018,291 B1 | 3/2006 | Lemke et al. |
| 7,025,189 B1 | 4/2006 | Petrusan |
| 7,201,660 B2 | 4/2007 | Kiely |
| 7,351,145 B1 | 4/2008 | Ornstein et al. |
| 7,559,839 B2 | 7/2009 | Bahar |
| D628,199 S | 11/2010 | Yukikado |
| D628,913 S | 12/2010 | Cheng |
| D641,018 S | 7/2011 | Lee |
| D647,574 S | 10/2011 | Zhang |
| 8,157,643 B1 | 4/2012 | Phan |
| D669,076 S | 10/2012 | Haller |
| 8,282,480 B2 | 10/2012 | Wells |
| 8,430,733 B2 | 4/2013 | Chang et al. |
| 8,591,306 B1 | 11/2013 | Kearns |
| D698,353 S | 1/2014 | Choi |
| 8,814,681 B2 | 8/2014 | Wells et al. |
| 8,814,706 B2 | 8/2014 | Wells et al. |
| 8,968,086 B2 | 3/2015 | Wells et al. |
| D726,295 S | 4/2015 | Kim |
| 9,147,318 B2 | 9/2015 | Tarantino |
| 9,240,100 B2 | 1/2016 | Tarantino |
| 9,292,996 B2 | 3/2016 | Davis et al. |
| D761,901 S | 7/2016 | Kim |
| 9,489,799 B2 | 11/2016 | Saffari et al. |
| D778,279 S | 2/2017 | Pendise |
| 9,754,455 B2 | 9/2017 | Tarantino |
| D811,488 S | 2/2018 | To et al. |
| 9,940,779 B2 | 4/2018 | To et al. |
| D824,906 S | 8/2018 | Feng et al. |
| D826,228 S | 8/2018 | Feng et al. |
| 2002/0120572 A1 | 8/2002 | Bellucci |
| 2003/0058372 A1 | 3/2003 | Williams |
| 2003/0089010 A1 | 5/2003 | Wechter |
| 2004/0033095 A1 | 2/2004 | Saffari |
| 2005/0026680 A1 | 2/2005 | Gururajan |
| 2006/0202422 A1* | 9/2006 | Bahar ............... G07F 17/3234 273/274 |
| 2006/0205498 A1 | 9/2006 | Kogo |
| 2007/0155490 A1* | 7/2007 | Phillips ............. G07F 17/3232 463/29 |
| 2008/0139274 A1 | 6/2008 | Baerlocher |
| 2008/0261699 A1* | 10/2008 | Topham ............ G07F 17/3232 463/42 |
| 2009/0075725 A1 | 3/2009 | Koyama |
| 2009/0082079 A1 | 3/2009 | Kuhn |
| 2009/0098932 A1 | 4/2009 | Longway |
| 2009/0253478 A1 | 10/2009 | Walker |
| 2010/0178989 A1 | 7/2010 | Kuhn |
| 2010/0244380 A1 | 9/2010 | Walker |
| 2010/0291675 A1 | 11/2010 | Pease |
| 2011/0050602 A1 | 3/2011 | Jeong et al. |
| 2011/0195786 A1 | 8/2011 | Wells |
| 2011/0195792 A1 | 8/2011 | Wells |
| 2014/0370989 A1 | 12/2014 | Acres |
| 2015/0014925 A1 | 1/2015 | Miller |
| 2015/0375096 A1 | 12/2015 | Jackson |
| 2016/0071367 A1 | 3/2016 | Litman |
| 2016/0093135 A1 | 3/2016 | Bond |
| 2016/0225226 A1* | 8/2016 | Pereo-OcHoa ..... G07F 17/3276 |
| 2016/0328913 A1 | 11/2016 | Blazevic |
| 2017/0330136 A1 | 11/2017 | Bratter |
| 2018/0005486 A1* | 1/2018 | Risnoveanu ........ G07F 17/3234 |
| 2018/0068517 A1 | 3/2018 | Drennan |
| 2018/0189921 A1 | 7/2018 | Feng |
| 2018/0190063 A1 | 7/2018 | Feng et al. |
| 2018/0190064 A1 | 7/2018 | Feng |
| 2019/0164381 A1 | 5/2019 | Feng |

OTHER PUBLICATIONS

Notice of Allowance for U.S. Appl. No. 29/600,225, dated May 15, 2018.
Notice of Allowance for U.S. Appl. No. 29/615,741, dated May 22, 2018.
Office Action for U.S. Appl. No. 15/396,308, dated Sep. 21, 2018.
Final Office Action for U.S. Appl. No. 15/396,308, dated Feb. 27, 2019.
Office Action for U.S. Appl. No. 15/396,342, dated Apr. 12, 2019.
Restriction Requirement for U.S. Appl. No. 15/688,841, dated Mar. 4, 2019.
Office Action for U.S. Appl. No. 15/826,680, dated May 16, 2019.
Karami et al., "Image Matching Using SIFT, SURF, BRIEF and ORB: Performance Comparison for Distorted Images", In Proceedings of the 2015 Newfoundland Electrical and Computer Engineering Conference,St. johns, Canada, Nov. 2015.
Office Action for U.S. Appl. No. 15/688,841, dated Jul. 15, 2019.

* cited by examiner

DEALER AND GAMING APPARATUS CONTROL SYSTEM FOR GAMING ESTABLISHMENTS

CROSS REFERENCE TO RELATED APPLICATIONS

This application is related to U.S. patent application Ser. No. 15/396,308, filed Dec. 30, 2016, and entitled "LOGISTIC MANAGEMENT OF GAMING SUPPLIES FOR GAMING ESTABLISHMENTS," which is incorporated herein for all purposes.

This application is also related to U.S. Patent Provisional Application No. 62/441,104, filed Dec. 30, 2016, and entitled "DEALER AND GAMING APPARATUS CONTROL SYSTEM FOR GAMING ESTABLISHMENTS," which is incorporated herein for all purposes.

BACKGROUND OF THE INVENTION

Today, gaming establishments, such as casinos, operate gaming apparatus, such as gaming tables that provide casino table games. Casino table games, such as Poker, Roulette, Black Jack, Craps, Baccarat, etc., often involve players sitting at a physical table using physical game objects (cards, dice, chips, etc.) to play the games.

To support such gaming tables, gaming establishments need to provide various support personnel as well as gaming supplies to gaming tables. For example, a gaming establishment might employ a full supporting staff of dealers, pit bosses, shift managers, cashier clerks, chip runners, waiters, service technicians, etc. to support its gaming tables. Gaming supplies often need replenished at gaming tables and various support personnel are enlisted to carry out replenishment.

In gaming establishments, there can be many gaming tables that are operated by dealers. Gaming establishments need to coordinate and manage dealers for gaming tables as well ensure that regulations for breaks, shift changes, etc. are complied with. There is also a need to have a status accounting of a gaming table, including an inventory of its gaming supplies, such as during a break or shift change. It is difficult for gaming establishments to efficiently manage and track its dealers, gaming tables and gaming supplies.

Accordingly, there is a need for improved approaches to schedule, monitor and manage dealers and/or gaming apparatus within a gaming establishment.

SUMMARY

Embodiments disclosed herein concern dealer control for gaming establishments, such as casinos. Using an electronic control system, authentication and authorization of dealers can be provided in a controlled manner that complies with predetermined rules. The predetermined rules can implement business or governmental restrictions on dealers, gaming apparatus or gaming. Gaming devices that are operated by dealers can also be controlled by an electronic control system. Through such electronic control, gaming apparatus can be controlled to be placed in a locked or unlocked condition. The electronic control system can also provide or facilitate monitoring of dealer status and actions and/or gaming apparatus status and events. Further, the electronic control system can provide notification, such as alerts, to dealers, managers and/or players.

The invention can be implemented in numerous ways, including as a method, system, device, apparatus (including computer readable medium and graphical user interface). Several embodiments of the invention are discussed below.

As a management system for management of dealers in a gaming establishment, the gaming establishment hosting a plurality of gaming apparatus, each of the gaming apparatus being configured to perform or facilitate a wager based game, and each of the gaming apparatus including or being proximate to a gaming support appliance having an electronic lock integral or proximate thereto, one embodiment can, for example, include at least: a management rules database configured to store a plurality of management rules applicable to a dealer of the gaming apparatus at the gaming establishment; and a dealer management server configured to control the electronic lock of the gaming support appliance of each of the gaming apparatus. The dealer management server can, in one embodiment, be configured to: identify a set of dealer management rules applicable to the dealer; determine when operation of the gaming apparatus by the dealer should cease based on at least one or more of the configured dealer management rules in the set of dealer management rules; and initiate activation of the electronic lock of the gaming support appliance of the gaming apparatus being operated by the dealer when it is determined that operation of the gaming apparatus by the dealer should cease.

As a computer-implemented method for managing dealer operation of a wager-based gaming apparatus, one embodiment can, for example, include at least: receiving a dealer login request from a dealer seeking to serve as dealer at the wager-based gaming apparatus; determining whether the dealer is authenticated; determining whether operation of the wager-based gaming apparatus by the dealer complies with a management schedule; and permitting the dealer to serve as dealer of the wager-based gaming apparatus provided that (i) the determining determines that the dealer is authenticated and (ii) the determining determines that operation of the wager-based gaming apparatus by the dealer complies with a management schedule.

As a computer readable medium including at least computer program code tangibly stored therein for managing dealer operation of a wager-based gaming apparatus, one embodiment can, for example, include at least: computer program code for receiving a dealer login request from a dealer seeking to serve as dealer at the wager-based gaming apparatus; computer program code for determining whether the dealer is authenticated; computer program code for determining whether operation of the wager-based gaming apparatus by the dealer complies with a management schedule; and computer program code for permitting the dealer to serve as dealer of the wager-based gaming apparatus provided that the computer program code for determining determines that the dealer is authenticated and provided that the computer program code for determining determines that operation of the wager-based gaming apparatus by the dealer complies with a management schedule.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like elements, and in which.

DETAILED DESCRIPTION OF CERTAIN EMBODIMENTS

Embodiments disclosed herein concern dealer control for gaming establishments, such as casinos. Using an electronic control system, authentication and authorization of dealers can be provided in a controlled manner that complies with predetermined rules. The predetermined rules can implement business or governmental restrictions on dealers, gaming apparatus or gaming. Gaming devices that are operated by dealers can also be controlled by an electronic control system. Through such electronic control, gaming apparatus can be controlled to be placed in a locked or unlocked condition. The electronic control system can also provide or facilitate monitoring of dealer status and actions and/or gaming apparatus status and events. Further, the electronic control system can provide notification, such as alerts, to dealers, managers and/or players.

According to one embodiment, the electronic control system can be highly automated and make use of computing resources, electronic displays, and databases. In one implementation, the electronic control system can be fully electronically operated. For example, once configured, an electronic control system can provide dealer and gaming apparatus control using one or more electronic devices, such as computing devices. In another implementation, the electronic control system can partially electronically provide dealer and gaming apparatus control. For example, once configured, an electronic control system can provide dealer and gaming apparatus control using one or more electronic devices, such as computing devices, which can cause a dealer to end their shift and/or a gaming device to become non-operational.

Embodiments of various aspects of the invention are discussed below with reference to FIGS. 1-17. However, those skilled in the art will readily appreciate that the detailed description given herein with respect to these figures is for explanatory purposes as the invention extends beyond these limited embodiments.

Figure 1:
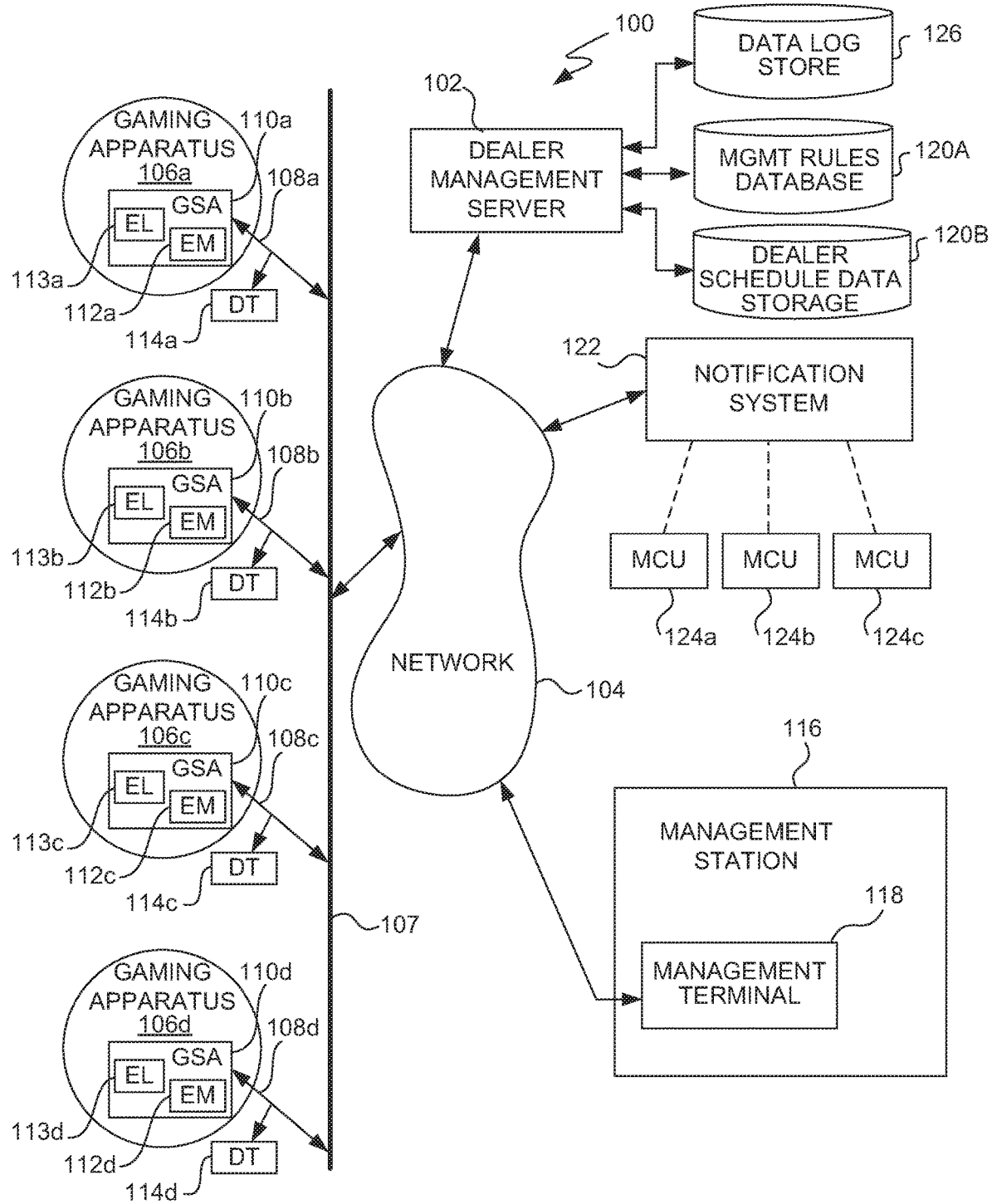
FIG. 1 is a block diagram of a dealer management system according to one embodiment.

FIG. 1 is a block diagram of a dealer management system 100 according to one embodiment. The dealer management system 100 serves to provide dealer and gaming apparatus control within a gaming environment.

The dealer management system 100 includes a dealer management server 102 that provides backend processing for the dealer management system 100. The dealer management server 102 is coupled to at least one network 104. The network 104 can be a global network, a local area network, and/or any combination of wired and/or wireless networks. The dealer management system 100 supports a plurality of gaming apparatus 106. In the embodiment illustrated in FIG. 1, the dealer management system 100 supports gaming apparatus 106a, gaming apparatus 106b, gaming apparatus 106c, and gaming apparatus 106d. The gaming apparatus 106a-106d can pertain to a game of chance, such as a wager-based game or a skill-based game, or some combination thereof. Examples of gaming apparatus include gaming tables and slot machines. The gaming apparatus 106a can couple to the network 104 by way of a main network link 107 and an apparatus network link 108a. Similarly, the gaming apparatus 106b can couple to the network 104 by way of the main network link 107 and an apparatus network link 108b; the gaming apparatus 106c can couple to the network 104 by way of the main network link 107 and an apparatus network link 108c; and the gaming apparatus 106d can couple to the network 104 by way of the main network link 107 and an apparatus network link 108d.

The gaming apparatus 106 can also include or make use of (e.g., couple to) a gaming support appliance 110a-n (where n is an integer). The gaming support appliance 110a-n is an electronic device that is coupled or proximate to the gaming apparatus 106a. The gaming support appliance 110a-n can include at least one electronic monitor 112a-n and at least one electronic lock 113a-n. The electronic monitor 112a-n can provide electronic monitoring of an aspect of the gaming apparatus 106a. For example, the gaming support appliance 110a-n having the at least one electronic monitor 112a-n can pertain to a card shoe, a chip rack, or a money drawer, which can be monitored by the at least one monitor 112a-n thereof. In such examples, the gaming supplies associated with the gaming apparatus 106a being made available and monitored by the gaming support appliance 110a-n would, for example, be the cards, chips and money, respectively. The electronic lock 113a-n can provide an ability to electronically lock or unlock the associated gaming support appliance 110a-n. For example, the electronic lock 113a-n can be implemented differently depending on the type of the corresponding gaming support appliance 110a-n. For example, the electronic lock 113a-n can include or receive a cover that can be placed at least partially over the gaming support appliance 110a-n to as to secure gaming supplies thereof. As another example, the electronic lock 113a-n can disable an electronic releasing mechanism that otherwise permits release of gaming supplies therefrom. In different embodiment, the electronic lock 113a–n can be implemented automatically (i.e., electrically controlled), partially manually (e.g., manually positioned and electrically monitored), or a combination thereof.

In addition, a dealer terminal 114a–n is electronically coupled to the gaming support appliance 110a–n, such as via the apparatus network link 108a. The dealer terminal 114a–n can provide a display that can present information to a person associated with the gaming apparatus 106a. For example, the gaming apparatus 106a can support a dealer associated with a wagering game being carried out at the gaming apparatus 106a. The dealer terminal 114a–n can present information to the person (e.g., dealer) associated with the gaming apparatus 106a and/or can permit the person to request or receive information associated with the gaming apparatus 106a, such as information pertaining to dealer breaks, dealer schedule, or gaming supplies for use at the gaming apparatus 106a.

Furthermore, the dealer management system 100 can include a management station 116. The management station 116 provides information and tools to facilitate management of personnel or gaming apparatus. The management station 116 can include a management terminal 118. The management terminal 118 can be operatively connected to the network 104. The management terminal 118 can be used by personnel at the management station 116. The management terminal 118 can, for example, include or couple to a display device to present information for use by the personnel (e.g., management personnel). For example, the management terminal 118 can present information concerning a pending break or a shift change of dealers a particular gaming apparatus. The information displayed can thus inform the management personnel that the particular gaming apparatus, or its dealer, is in need of a break or shift change.

The management station 118 might also store or manage inventory for gaming supplies, and might receive and process an incoming re-supply request from a particular gaming apparatus. The information displayed can thus inform personnel that the particular gaming apparatus, or its dealer, is in need of re-supply of particular gaming supplies.

Further still, the dealer management system 100 can include a notification system 122. The notification system 122 can be utilized to provide notifications to any persons interacting with the dealer management system 100. The notification system 122 can provide notifications to various persons. For example, the notifications can be provide to dealers associated with gaming apparatus 106, personnel associated with management station 116, and/or notifications to attendants (e.g., delivery attendants). For notifications to dealers, the notification system 122 can send notifications to the dealer terminal 114a–n associated with the gaming apparatus 106 where the dealer is operating. For notifications to personnel, such as managers (e.g., pit bosses), the notification system 122 can send notifications to the management terminal 118 associated with the management station 116 where the personnel is assigned. With respect to notifications to attendants, the attendants are typically associated with mobile communication units 124, whereby the notification system 122 can send notifications to particular attendants. As illustrated in FIG. 1, the notification system 122 can provide notifications to any one or more of the mobile communications units 124a–n. As an example, the mobile communication units 124a–n are normally associated with different attendants, dealers, managers, or other personnel.

The dealer management system 100 can also include a management rules database 120A that can be coupled to the dealer management server 102. The management rules database 120A can provide storage for management rules for use by the dealer management server 102. In addition, the dealer management system 100 can also include a dealer schedule data storage 120B that provides storage for dealer schedule data. Still further, the dealer management system 100 can also include a log store 126 that can be used to store data descriptive of all events or transactions associated with the dealer and/or gaming apparatus for future review, audit, and the like.

The dealer management system 100 can also be implemented together with a logistic management system, such as detailed in U.S. patent application Ser. No. 15/396,308, filed Dec. 30, 2016, and entitled "LOGISTIC MANAGEMENT OF GAMING SUPPLIES FOR GAMING ESTABLISHMENTS," which is hereby incorporated by reference. A logistics management system can provide active supply status data pertaining to the plurality of gaming apparatus 106. In this regard, the gaming apparatus 106 can make use of the gaming support appliance 110a–n having the at least one electronic monitor 112a–n to acquire the data pertaining to the status of supplies at the associated gaming apparatus 106. Such supply status data pertaining to the gaming apparatus 106 can be transmitted to the dealer management server 102 or a logistics management server for storage in a transaction database or some other storage device. The supply status data can be provided to the dealer management server 102 or the logistic management server by the gaming apparatus 106 (or its gaming support appliance 110a–n) in real-time or near real-time. For example, the supply status data could be provided whenever a change has been identified, on a periodic basis, or when manually or automatically triggered, or some combination thereof. A logistics management system can also interact with a supply repository to track quantities of gaming supplies resident within the supply depository. The gaming supplies can include cash, cards and chips. The quantities of the gaming supplies at the supply depository can be monitored or recorded in any of a variety of different ways, including manual counting and data entry into a management terminal, or through use of electronic sensors using an electronic appliance, or some combination thereof.

Figure 2:
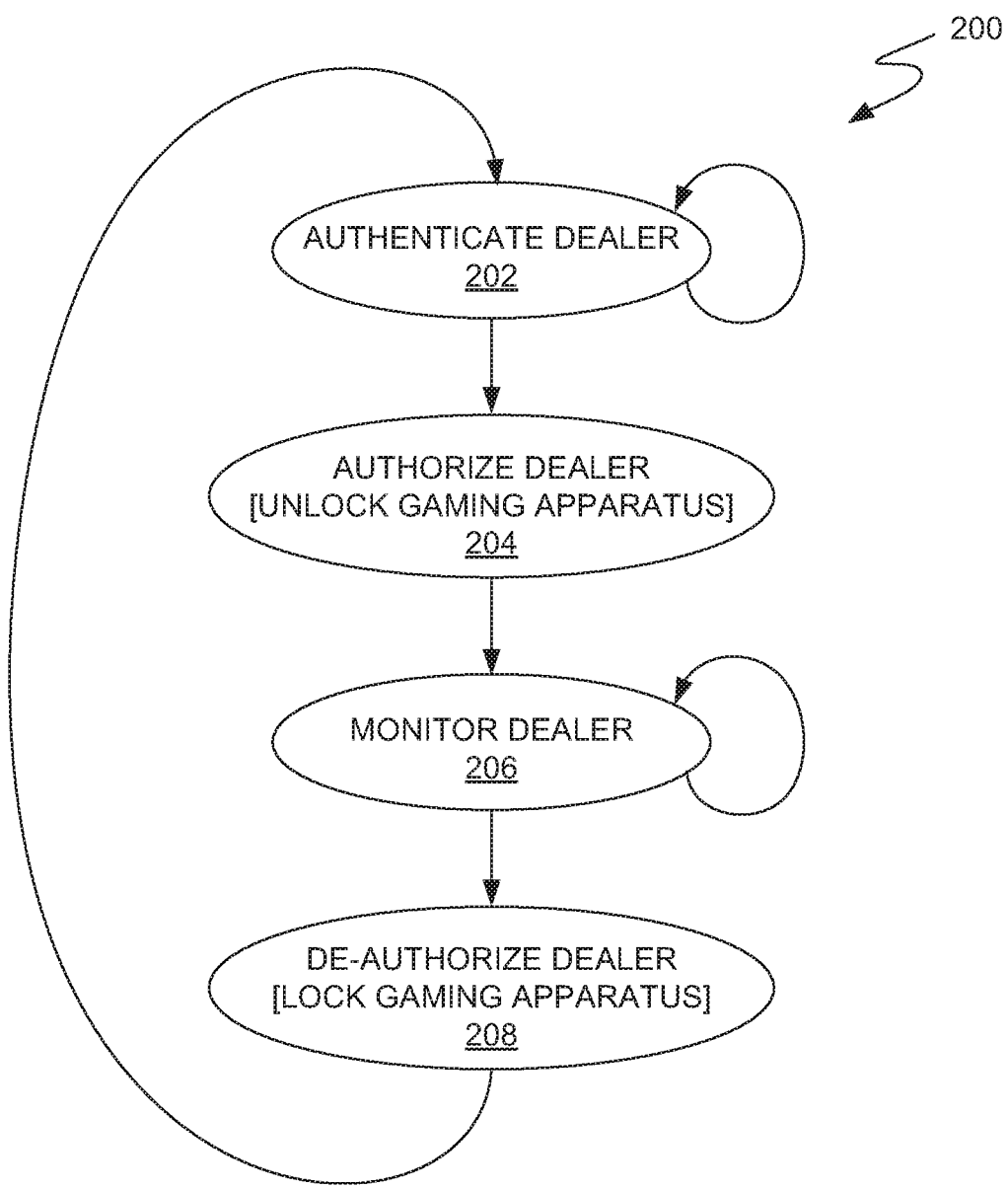
FIG. 2 illustrates a state diagram for operation of a dealer authorization and monitoring system according to one embodiment.

FIG. 2 illustrates a state diagram for operation of a dealer authorization and monitoring system 200 according to one embodiment. The dealer authorization and monitoring system 200 can include four different operational states. The state diagram can be implemented by a dealer management server, such as the dealer management server 102 illustrated in FIG. 1.

In a first state 202, a dealer can be authenticated. Typically, a dealer would request to be authenticated by supplying identifying information to electronic system, which would then evaluate whether or not the dealer is able to be uniquely identified and thus authenticated. For example, the identifying information can be a key code or password, a key card or fob identifier, an audio input, a biometric input, and the like. Until a dealer can be authenticated, the state machine remains in the first state 202. Once a dealer is successfully authenticated, then processing can transition to a second state 204.

In the second state 204, the dealer can be authorized. Here, the authorization is to enable the dealer to utilize a gaming apparatus. In other words, in the second state 204, the processing is determining whether the gaming apparatus can be unlocked for operation by the dealer. Here, authorization of a dealer can check compliance with rules, schedules, etc. If the dealer is successfully authorized, then processing can transition to a third state 206.

In the third state 206, the dealer's interaction with at the gaming apparatus can be monitored. The monitoring can utilize electronic sensing of various physical game play items and/or computer implemented monitoring of break times, shift changes, wagers, and the like. The monitoring can store data to an electronic log. As an example, the log data can be stored to the data log store 126 shown in FIG. 1. Typically, the monitoring at the third state 206 can be ongoing until the dealer is to de-authorized at a fourth state 208. For example, the state machine can remain in the third state 206 to monitor the dealer until the dealer takes a break, ends their shift or manually chooses to be de-authorized.

In the fourth state 208, the dealer can be de-authorized. Here, the dealer who has been previously authorized (at the second state 204) to utilize the gaming apparatus can be subsequently de-authorized such that the dealer is no longer able to operate the gaming apparatus. In other words, the fourth state 208 can cause the gaming apparatus to the locked to prevent further operation by the dealer (and typically any other person). After the gaming apparatus has been locked, the gaming apparatus can be subsequently unlocked at the second state 204 provided for the same dealer or another dealer, provided that dealer is able to the authenticated at the first state 202 and also authorized at the second state 204.

Figure 3:
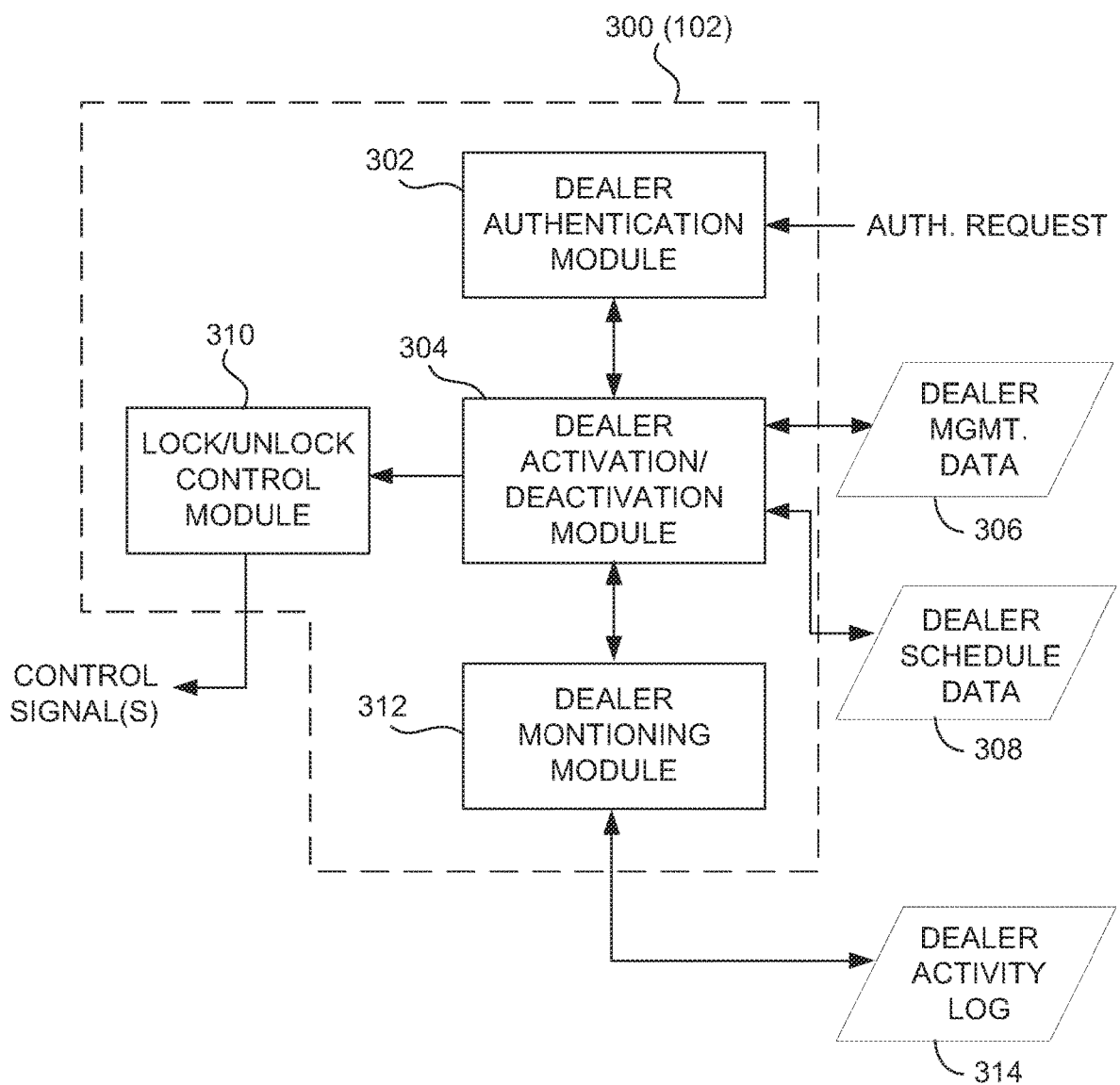
FIG. 3 is a block diagram of a dealer management server according to one embodiment.

FIG. 3 is a block diagram of a dealer management server 300 according to one embodiment. The dealer management server 300 is, for example, one implementation of a dealer management server, such as the dealer management server 102 illustrated in FIG. 1.

The dealer management server 300 can include a dealer authentication module 302. The dealer authentication module 302 serves to authenticate that the dealer, whom is0 typically seeking to login to a gaming apparatus. More particularly, the dealer authentication module 302 receives an authentication request from a dealer seeking to operate a gaming apparatus, and then evaluates the authentication request to determine whether the dealer can been properly authenticated. The authentication seeks to particularly identify the dealer as a known dealer through use of identification data. The authentication request from the dealer includes identification data for identification of the dealer. The identification data can, for example, include a key code or password, a key card or fob identifier, an audio input, a biometric input, and the like.

The dealer management server 300 can also include a dealer activation/deactivation module 304. The dealer activation/deactivation module 304 can determine whether the dealer, whom has already been authenticated, is permitted to be activated for use of the gaming apparatus. A dealer that is activated, i.e., permitted to use a particular gaming apparatus, can also be referred to as being authorized to operate the particular gaming apparatus. In doing so, the dealer activation/deactivation module 304 can make use of dealer management rules 306 and/or dealer schedule data 308. The dealer management rules 306 include various business, establishment, or governmental rules that impact how and/or when a dealer is able to operate a gaming apparatus. For example, the dealer management rules 306 can impact how frequently a dealer should receive a break, or how frequently shift changes should occur. The dealer management rules 306 can also include rules that pertain to how a gaming apparatus is to be operated by a dealer, such as player-banker limitations. The dealer schedule data 308 can specify shifts for dealers and assignments to particular gaming apparatus during shifts.

The dealer activation/deactivation module 304 can further communicate with a lock/unlock control module 310. The lock/unlock control module 310 produces control signals that can be supplied to electronic locks associated with gaming apparatus. For example, the control signals can be provided to the electronic locks 112 shown in FIG. 1 to control whether such electronic locks 112 are in a locked position or in an unlock position. In one embodiment, if the dealer activation/deactivation module 304 determines that the dealer (that has been authenticated) is permitted to operate the gaming apparatus, then the dealer is deemed activated. In such case, the dealer activation/deactivation module 304 can communicate with the lock/unlock control module 310 to cause the gaming apparatus to be unlocked. In this case, the activation/deactivation module 304 can communicate with the lock/unlock control module 310 to unlock the gaming apparatus by sending one or more control signals to the one or more electronic locks 112*a*–n associated with that gaming apparatus. Alternatively, in one embodiment, if the dealer activation/deactivation module 304 determines that the dealer (that has been authenticated) is not permitted (or no longer permitted) to operate the gaming apparatus, then the dealer is deemed deactivated. A dealer that is deactivated, i.e., not permitted to use a particular gaming apparatus, can also be referred to as being unauthorized to operate the particular gaming apparatus. In such case, the dealer activation/deactivation module 304 can communicate with the lock/unlock control module 310 to cause the gaming apparatus to be locked. In this case, the activation/deactivation module 304 can communicate with the lock/unlock control module 310 to lock the gaming apparatus by sending one or more control signals to the one or more electronic locks 112*a*–n associated with that gaming apparatus.

The dealer activation/deactivation module 304 can also communicate with a dealer monitoring module 312. While the dealer is active with respect to the gaming apparatus, the dealer monitoring module 312 can cause data to be stored in a dealer activity log 314. The data being stored in the dealer activity log 314 can provide a log of all the activity associated with the dealer, including activation, deactivation, games played, player winnings, dealer winnings, tips, wagers placed, errors, schedule overruns, breaks, etc.

Figure 4:
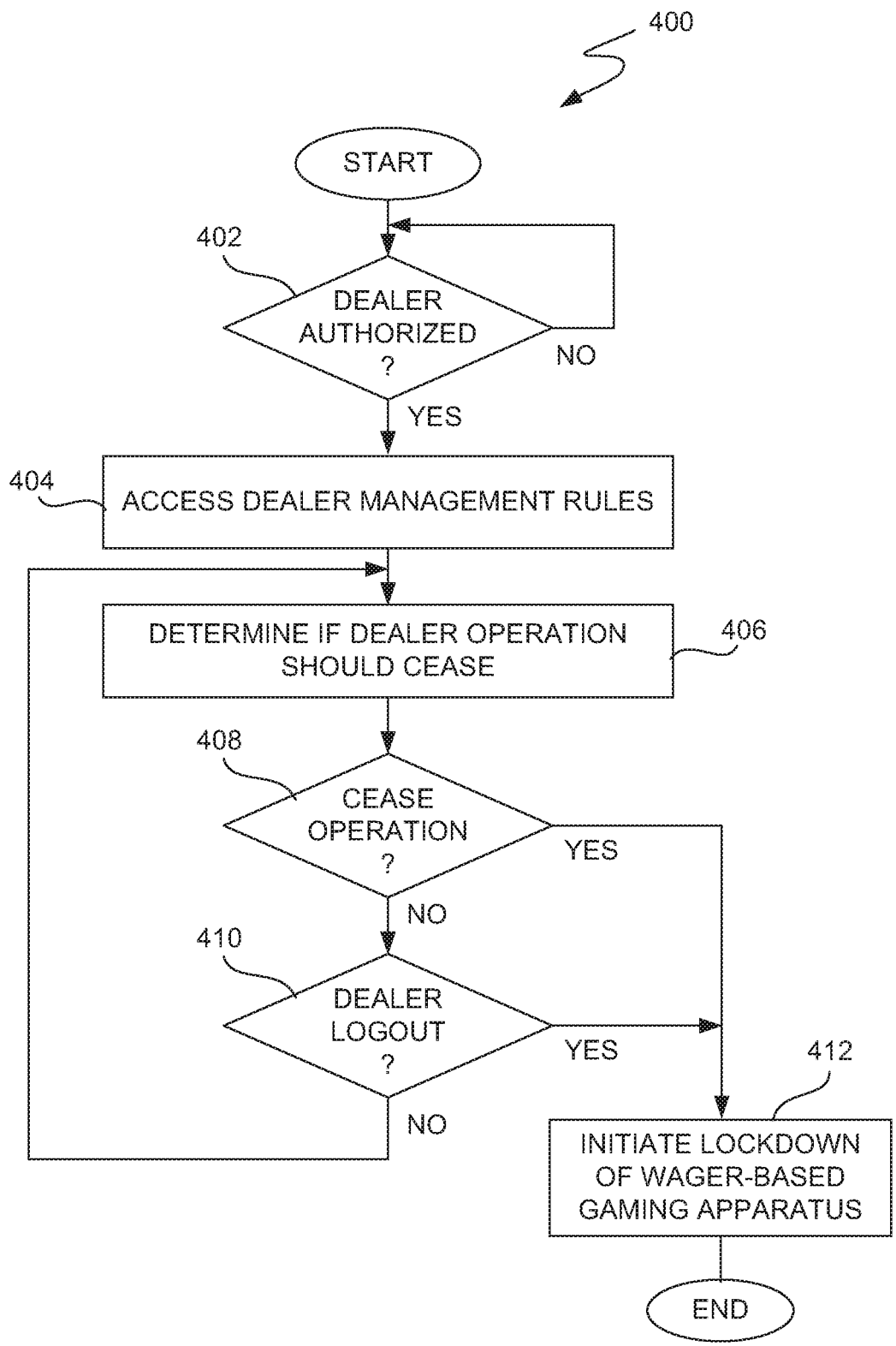
FIG. 4 is a flow diagram of a dealer management process according to one embodiment.

FIG. 4 is a flow diagram of a dealer management process 400 according to one embodiment. The dealer management process 400 is, for example, performed by a dealer management server, such as the dealer management server 102 illustrated in FIG. 1 or the dealer management server 300 illustrated in FIG. 3.

The dealer management process 400 can begin with a decision 402 that determines whether a dealer is authorized. In other words, after a dealer has been authorized to utilize a gaming apparatus, the dealer is able to operate the gaming apparatus. However, the dealer's authorization or ability to operate the gaming apparatus can be limited by business or governmental rules. The dealer management process 400 serves to ensure compliance with such business or governmental rules.

When the decision 402 determines that the dealer is not authorized, then the dealer management process 400 waits until a dealer is authorized. In this case, since the dealer is not authorized, then monitoring for rule compliance is typically not necessary because the dealer is not operating the gaming apparatus.

On the other hand, when the decision 402 determines that the dealer is authorized, then the dealer management process 400 can perform various operations to ensure compliance with such business or governmental rules. In this regard, dealer management rules are accessed 404. These dealer management rules can be configured by the business for one or more establishments operated by the business and can define rules that are to be complied with. One example of a rule is a rule that requires a dealer to take a break after working a period of time. Another example of a rule is a rule that requires a dealer not operate a gaming apparatus longer than a predetermined period of time (e.g., before being rescheduled to another gaming apparatus). Another example of a rule is a rule that requires a player-banker player to be changed after a predetermined time or predetermined events. Various other rules can be configured and utilized by the dealer management server.

After the dealer management rules have been accessed 404, the dealer management process 400 can determine 406 if operation of the gaming apparatus by the dealer should cease. When the decision 408 determines that dealer operation of the gaming apparatus should not cease, then, a decision 410 can determine whether the dealer has manually logged out with respect to the gaming apparatus. When the decision 410 determines that the dealer has not manually logged out from the gaming apparatus, the dealer management process 400 can return to repeat the block 406 and subsequent blocks. Alternatively, when the decision 408 determines that dealer operation of the gaming apparatus should cease or when the decision 410 determines that the dealer has manually logged out from the gaming apparatus, then the dealer management process 400 can initiate 412 lockdown of the gaming apparatus. The lockdown of the gaming apparatus can serve to de-authorize the dealer from operating the gaming apparatus and/or can physically lock one or more gaming support appliances associated with the gaming apparatus. Following the initiation 412 of the gaming apparatus, the dealer management process 400 can end.

Figure 5:
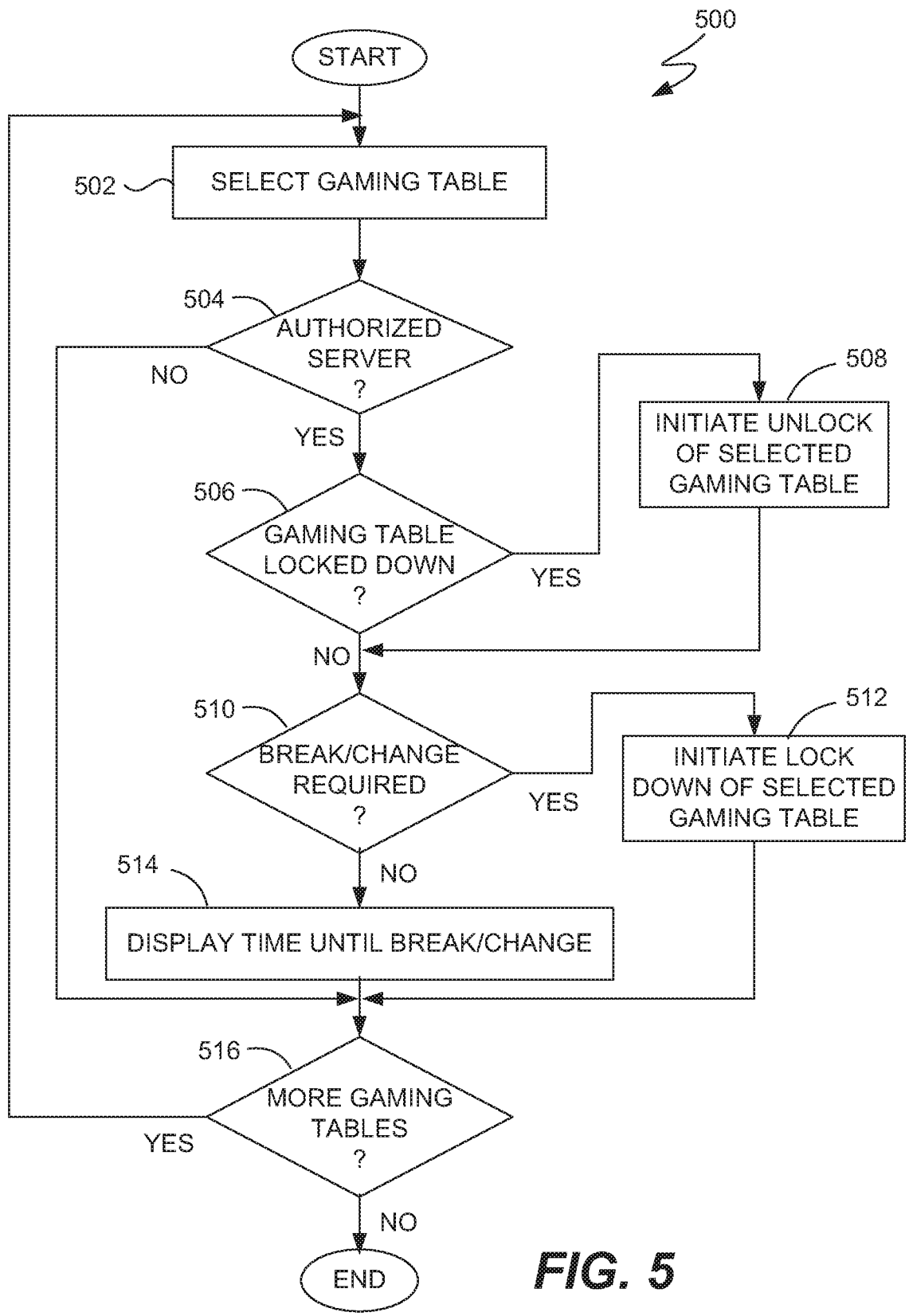
FIG. 5 is a flow diagram of an access control process according to one embodiment.

FIG. 5 is a flow diagram of an access control process 500 according to one embodiment. The access control process 500 is, for example, performed by a dealer management server, such as the dealer management server 102 illustrated in FIG. 1 or the dealer management server 300 illustrated in FIG. 3. Although the access control process 500 is described for use with a gaming table, it should be understood that other types of gaming apparatus could be used.

The access control process 500 can initially select 502 a gaming table for further processing. Typically, a gaming establishment has a plurality of gaming tables as well as various other gaming apparatus. Next, a decision 504 can determine whether an authorized dealer is associated with the selecting gaming table. Here, the access control process 500 evaluates whether a dealer is presently authorized to utilize the selecting gaming table. Authorization of a dealer is, for example, discussed herein. If the decision 504 determines that there is no authorized dealer for the selected gaming table, then the access control process 500 with respect to the selected gaming table effectively ends.

On the other hand, when the decision 504 determines that there is an authorized dealer presently associated with the selected gaming table, the access control process 500 continues. Namely, a decision 506 determines whether the selected gaming table is presently locked down. Here, a gaming table is lockdown when access to the gaming table, such as its associated gaming components, is restricted. When the decision 506 determines that the selected gaming table is locked down, the access control process 500 can initiate 508 unlock of the selected gaming table since there is presently an authorized dealer for the selected gaming table.

Following the block 508, or following the decision 506 when the selected gaming table is not presently locked down, the access control process 500 can perform a decision 510 that determines whether a dealer break or change is required. In this embodiment, the access control process 500 monitors operation of the selected gaming table to determine when the dealer is required to take a break or when the dealer shift should end. In this regard, when the decision 510 determines that a dealer break or change is required, the access control process 500 can initiate 512 lockdown of the selected gaming table. In this embodiment, the selected gaming table is lockdown whenever a dealer break or change is required. The lockdown of the selected gaming table serves to secure the gaming table and its gaming supplies during the dealer break or change. Alternatively, when the decision 510 determines that a dealer break or change is not required, the access control process 500 can display 514 a time until the dealer break or change is required. The time until the dealer break or change can be displayed 514 on one or more display devices, such as dealer displays, table displays, player displays, or manager displays. The one or more displays are typically associated with computing devices (including mobile communication devices, such as smart phones).

Following the blocks 512 and 514, as well as following the decision 504 when there is no authorized dealer, a decision 516 can determine whether there are more gaming tables to be processed. Typically, each of the plurality of gaming tables available in an establishment are periodically processed in accordance with the access control process 500 so that locking down gaming tables or unlocking gaming tables can be periodically performed to yield efficient and timely access control to gaming tables. When the decision 516 determines that there are more gaming tables to be similarly processed, the access control process 500 can return to repeat the block 502 where a another gaming table can be selected. Eventually, when the decision 516 determines that there are no more gaming tables to be processed, the access control process 500 can end. However, typically, the access control process 500 would be periodically performed.

Figure 6:
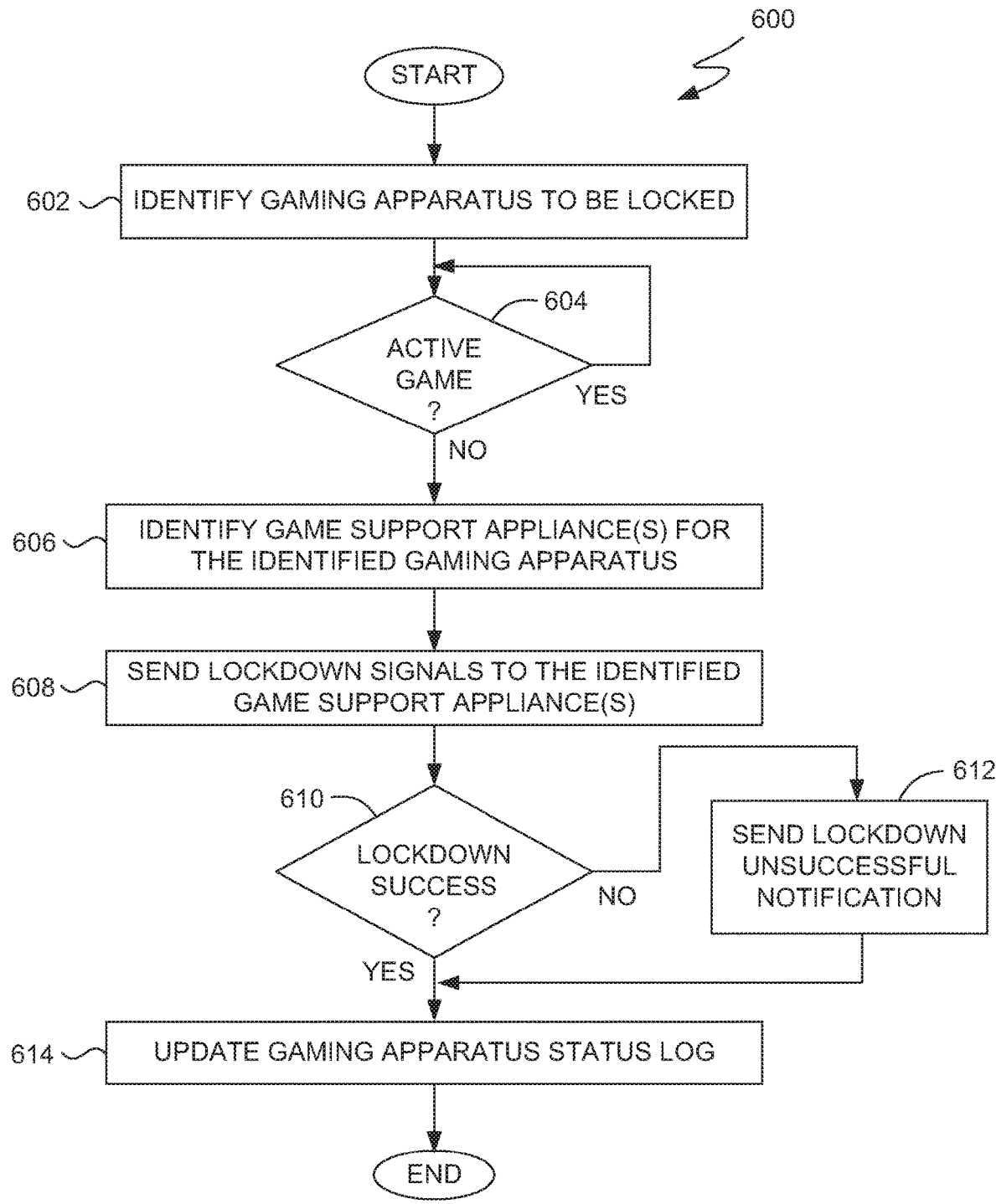
FIG. 6 is a flow diagram of a lockdown process according to one embodiment.

FIG. 6 is a flow diagram of a lockdown process 600 according to one embodiment. The lockdown process 600 can, for example, be performed to lock down a gaming apparatus, such as a gaming table. For example, the lockdown process 600 can be activated in response to initiation 512 of lockdown as shown in FIG. 5. The lockdown process 600 is, for example, performed by a dealer management server, such as the dealer management server 102 illustrated in FIG. 1 or the dealer management server 300 illustrated in FIG. 3.

The lockdown process 600 can identify 602 a gaming apparatus to be locked. Next, a decision 604 can determine whether a game is currently active on the identified gaming apparatus. When the decision 604 determines that a game is currently active, the lockdown process 600 can await completion of the game. Once the decision 604 determines that there is no active game on the identified gaming apparatus, one or more game support appliances for the identified gaming apparatus can be identified 606. As an example, the gaming apparatus 106 illustrated in FIG. 1 can make use of gaming support apparatus 110a–n which include one or more electronic locks 112a–n.

Next, lockdown signals can be sent 608 to the one or more identified gaming support appliances. In this regard, the lockdown process 600 can send lockdown signals, which are control signals, to the one or more identified gaming support appliances associated with the identified gaming device. For example, if the identified gaming apparatus is the gaming apparatus 106*a* illustrated in FIG. 1, then the one or more identified gaming support appliances can include the gaming support appliance 110*a*–n, and the lockdown process 600 can send the lockdown signals to the gaming support appliance 110*a*–n.

A decision 610 can then determine whether lockdown of the identified gaming apparatus has been successful. When the decision 610 determines that the lockdown of the identified gaming apparatus has not been successful, a lockdown unsuccessful notification can be sent 612. For example, the lockdown unsuccessful notification can be sent 612 to a manager overseeing operation of the dealer and/or the identified gaming apparatus. Alternatively, when the decision 610 determines that the lockdown of the identified gaming apparatus has been successful, no such notification is needed. However, in one embodiment, a notification of a successful lockdown of the identified gaming apparatus could be provided to an interested person, such as the manager overseeing the operation of the dealer and/or the identified gaming apparatus.

Thereafter, following the decision 610 or the block 612, a gaming apparatus status log can be updated 614. For example, the gaming apparatus status log can record data to detail when and why a gaming apparatus was lockdown, and/or whether or not lockdown was successful. The gaming apparatus status log could also include data to detail the status of various gaming support appliances and/or gaming supplies present at the identified gaming apparatus when the gaming apparatus was locked down. Following the block 614, the lockdown process 600 can end.

Figure 7:
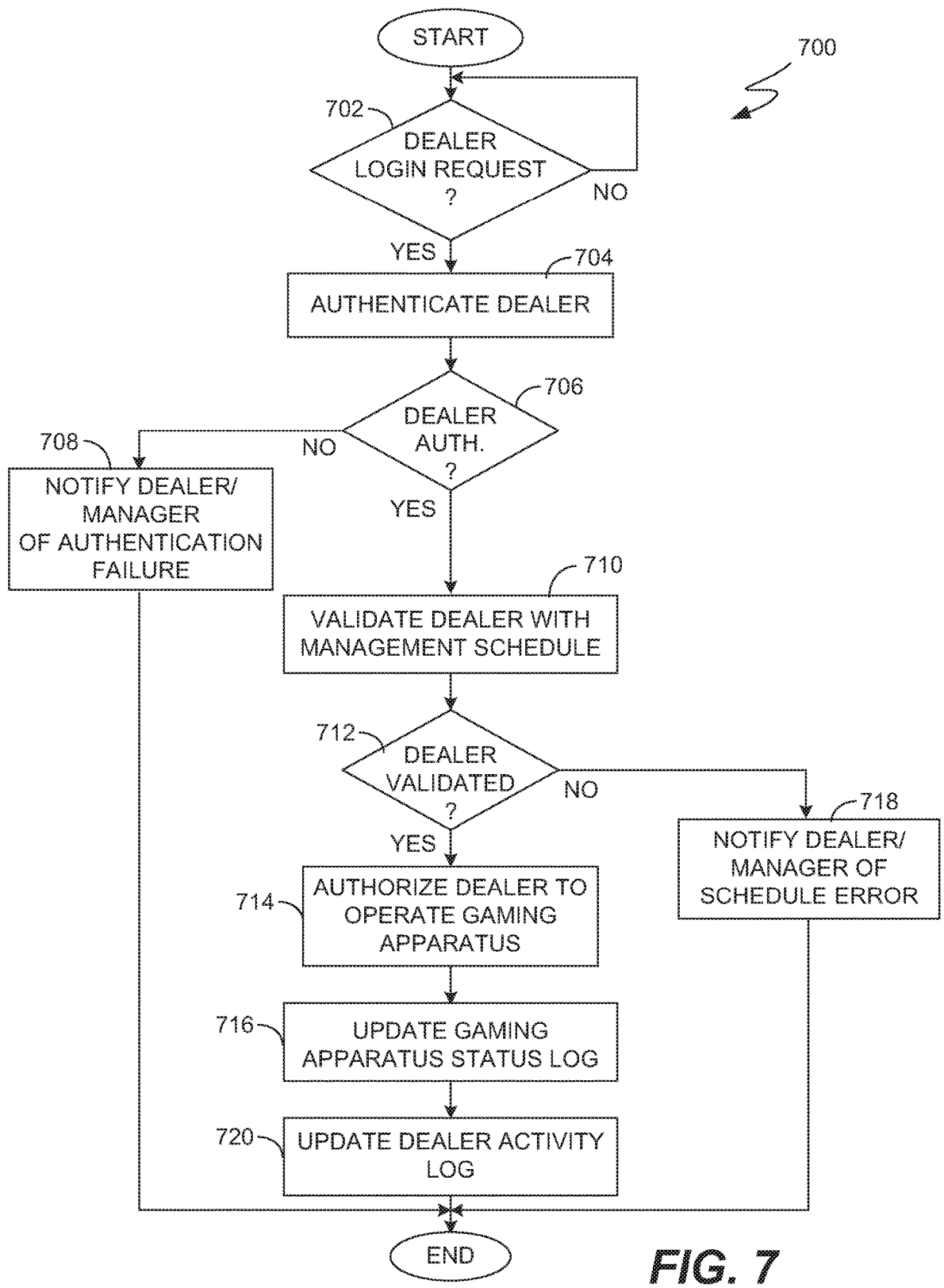
FIG. 7 is a flow diagram of a dealer authorization process according to one embodiment.

FIG. 7 is a flow diagram of a dealer authorization process 700 according to one embodiment. The dealer authorization process 700 is, for example, performed by a dealer management server, such as the dealer management server 102 illustrated in FIG. 1 or the dealer management server 300 illustrated in FIG. 3.

The dealer authorization process 700 can begin with a decision 702 that determines whether a dealer has made a login request. Here, a dealer attempts to login to a gaming apparatus in order to operate the gaming apparatus. When the decision 702 determines that a dealer has not logged in, the dealer authorization process 700 can await such a dealer login. When the decision 702 determines that a dealer login request has been received, the dealer authorization process 700 can attempt to authenticate 704 the dealer. Typically, the dealer login request includes some type of identifying information. The authentication processing can vary depending on different data that serves to identify the dealer to the dealer management server.

Next, a decision 706 can determine whether the dealer has been authenticated. When the decision 706 determines that the dealer has not been authenticated, the dealer and/or manager of the dealer can be notified 708 of the failure of the dealer to be authenticated.

On the other hand, when the decision 706 determines that the dealer has been authenticated, the dealer authorization process 700 can continue. In this case, the dealer authentication process 700 can then validate 710 the dealer in accordance with a management schedule. In this regard, the dealer is being validated to check that the dealer is attempting to login to a particular gaming apparatus for which the dealer has been scheduled to operate. A decision 712 can then determine whether the dealer has been validated with the management schedule. When the decision 712 determines that the dealer has not been validated, the dealer and/or the dealer's manager can be notified 718 of a schedule error. Alternatively, when the decision 712 determines that the dealer has been validated, the dealer can be authorized 714 to operate the particular gaming apparatus.

Thereafter, a game apparatus status log can be updated 716 to include data indicating when the particular dealer was authorized operate the particular gaming apparatus. Following the blocks 708, 718 and 716, a dealer activity log can be updated 720 to include data indicating when the particular dealer was logged in and permitted to operate the particular gaming apparatus. Following the block 720, the dealer authorization process 700 can end.

Figure 8:
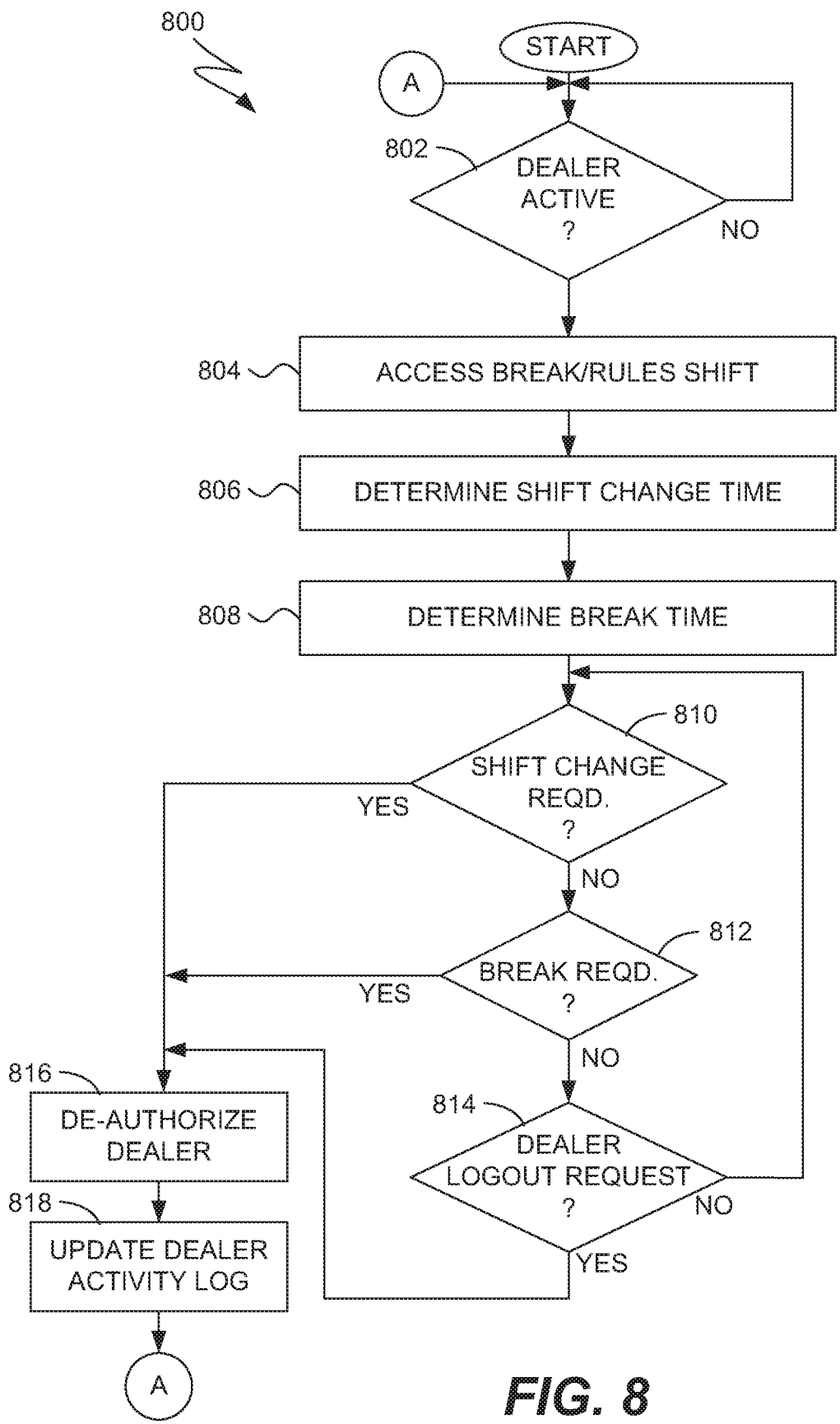
FIG. 8 illustrates a dealer de-authorization process according to one embodiment.

FIG. 8 illustrates a dealer de-authorization process 800 according to one embodiment. The dealer de-authorization process 800 is, for example, performed by a dealer management server, such as the dealer management server 102 illustrated in FIG. 1 or the dealer management server 300 illustrated in FIG. 3.

The dealer de-authorization process 800 can begin with a decision 802 that determines whether a dealer being monitored is currently active. Here, the dealer de-authorization process 800 can monitor a plurality of different dealers. The dealer de-authorization process 800 is described in the context of processing for a single dealer.

When the decision 802 determines that the dealer is not active, the dealer de-authorization process 800 awaits until the dealer is active before the dealer de-authorization process 800 is further performed. Once the decision 802 determines that the dealer is active, break/shift rules are accessed 804. For example, the brake/shift rules can be obtained by or from a dealer management server, such as the dealer management server 102 illustrated in FIG. 1, the dealer management server 300 illustrated in FIG. 3, or the dealer management server 1242 illustrated in FIG. 12A. The brake/shift rules can be retrieved from a database or data store, such as the management rules database 120A shown in FIG. 1 or the dealer management rules 306 shown in FIG. 3.

Next, a shift change time can be determined 806, and a break time can be determined 808. The shift change time can be determined 806 for the dealer using the shift rules that have been accessed 804. The break time can be determined 808 for the dealer using the break rules that have been accessed 804.

Subsequently, the dealer de-authorization process 800 can perform processing to evaluate and enforce the shift rules and the break rules. In this regard, a decision 810 can determine whether a shift change is required. When the decision 810 determines that a shift change is not required, then, a decision 812 can determine whether a break is required. When the decision 812 determines that a break is not required, a decision 814 can determine whether a dealer logout request has been received. The dealer logout request is, for example, a manual request from the dealer to be logged out. When the decision 814 determines that a dealer logout request has not been received, then the dealer de-authorization process 800 returns to repeat the decision 810 and subsequent blocks so that the dealer de-authorization process 800 can continue to evaluate and enforce the shift rules and the break rules.

On the other hand, when the decision 810 determines that a shift change is required, or when the decision 812 determines that a break is required, or when the decision 814 determines that a dealer logout request has been received, then the dealer de-authorization process 800 can de-authorize 816 the dealer. In one implementation, the de-authorization of the dealer effectuates a logout of the dealer from the associated gaming apparatus that the dealer has been operating. In any event, once the dealer is de-authorized 816, the dealer is no longer permitted to operate the associated gaming apparatus. In addition, the dealer activity log can be updated 818 to store an indication of when and why the dealer was the authorized. Following the block 818, the dealer de-authorization process 800 can return to repeat the decision 802 so that the same or another dealer can be similarly processed.

Figure 9:
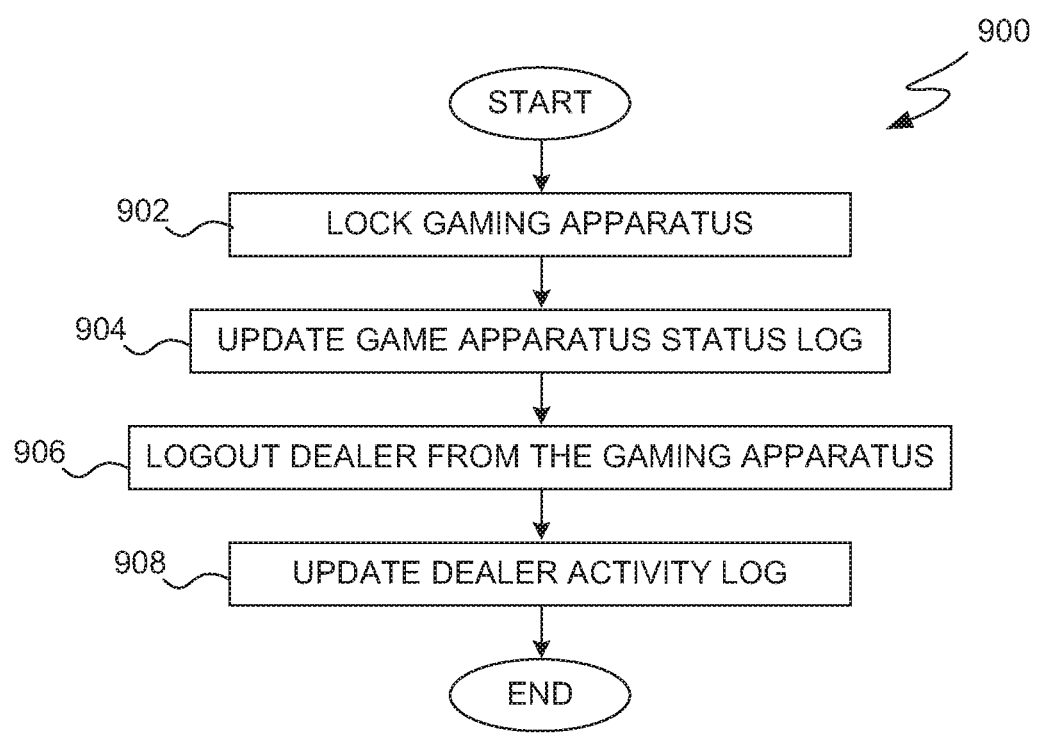
FIG. 9 is a flow diagram of a dealer logout process according to one embodiment.

FIG. 9 is a flow diagram of a dealer logout process 900 according to one embodiment. The dealer logout process 900 can be instituted to de-authorize the dealer. In other words, when a dealer is de-authorized, the dealer can be logged out from a gaming apparatus that the dealer has been logged in to and operating. In the embodiment illustrated in FIG. 9, the dealer logout process 900 can lock 902 a gaming apparatus. Here, the gaming apparatus being locked is the gaming apparatus to which the dealer has been logged in to. In the event that a game is presently pending on the gaming apparatus, in one implementation, the locking (or locked down) of the gaming apparatus can be deferred until the pending game is completed. A game apparatus status log can also be updated 904 to reflect the lockdown of gaming apparatus. In addition, the dealer can also be logged out (logged off) 906 from the gaming apparatus. Once the dealer is logged out 906 from the gaming apparatus, the dealer is no longer able to operate the gaming apparatus. For example, a dealer terminal associated with the gaming apparatus will not permit to a dealer to operate the dealer terminal unless the dealer is logged in. After the dealer has been logged out 906, a dealer activity log can be updated 908 to reflect when and why the dealer was logged out 906. Following the block 908, the dealer logout process 900 can end.

Figure 10A:
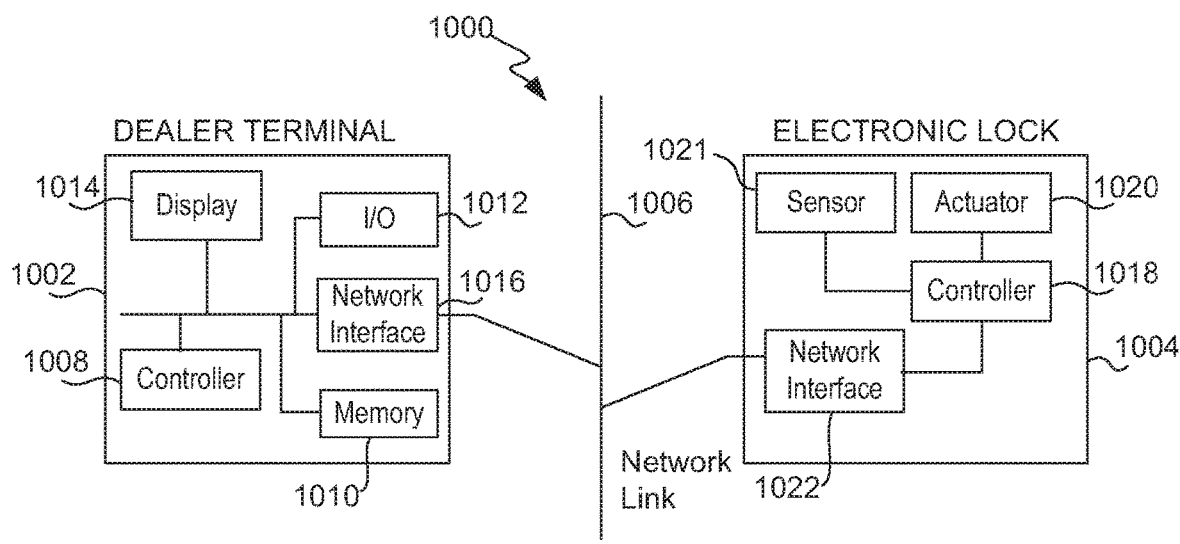
FIGS. 10A-10C illustrate different monitoring configurations according to different embodiments.
Figure 10B:
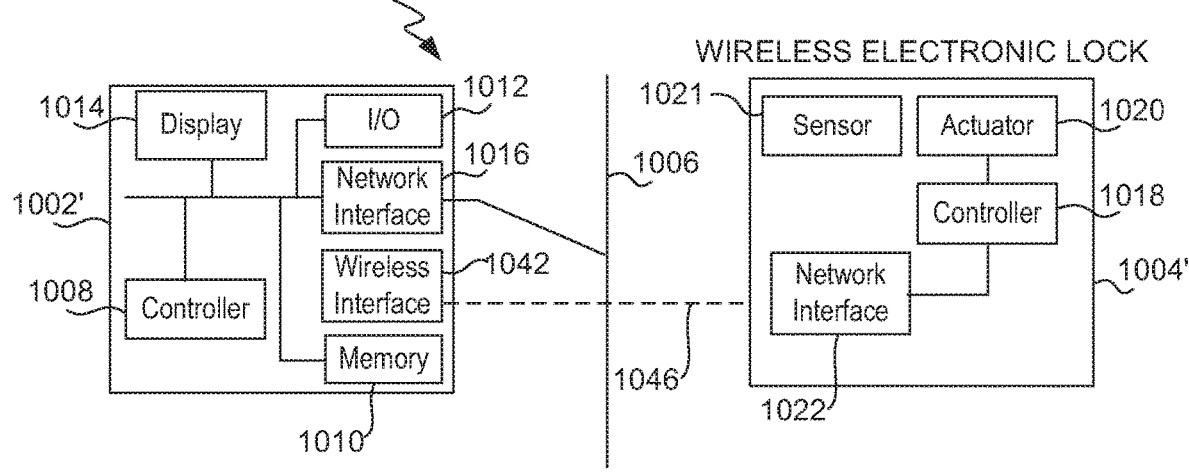
Figure 10C:
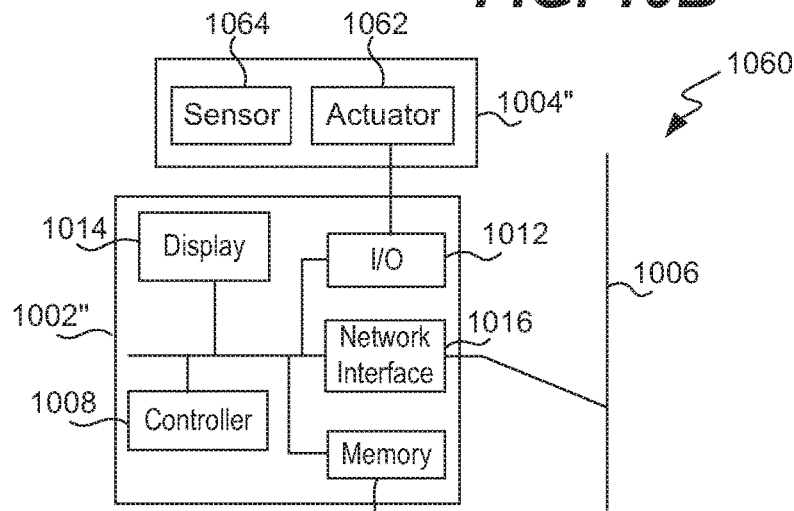

FIGS. 10A-10C illustrate different monitoring configurations according to different embodiments. The different monitoring configurations can be utilized with a dealer management system, such as the dealer management system 100 illustrated in FIG. 1.

FIG. 10A is a block diagram of a first locking configuration 1000 according to one embodiment. The first locking configuration 1000 includes a dealer terminal 1002 coupled to an electronic lock 1004 by way of one or more network links 1006. The dealer terminal 1002 is, for example, suitable for use as the dealer terminal 114a-n and/or the management terminal 118 illustrated in FIG. 1. The dealer terminal 1002 can include a controller 1008 that controls the overall operation of the dealer terminal 1002. In doing so, the controller 1008 couples to memory 1010, input/output interface 1012 and a display 1014. The controller 1008 also couples to a network interface 1016 that can coupled to the one or more network links 1006. The electronic lock 1004 can include a controller 1018 that controls the overall operation of the electronic lock 1004, which typically locks gaming support appliances and may also monitor gaming supplies. In doing so, the controller 1018 couples to one or more actuators 1020. The controller 1018 can also couple to one or more sensors 1021 if the electronic lock 1004 also provides monitoring of gaming supplies. The electronic monitor 1004 is also coupled to the one or more network links 1006 via a network interface 1022. The electronic monitor 1004 is typically part of or coupled to a gaming support appliance.

FIG. 10B is a block diagram of a second locking configuration 1040 according to one embodiment. The second locking configuration 1040 includes a dealer terminal 1002' coupled to an electronic lock 1004'. The second locking configuration 1040 is generally similar to the first lock configuration 1000. That is, the dealer terminal 1002' is similar to the dealer terminal 1002, and the electronic lock 1004' is similar to the electronic lock 1004. However, the second lock configuration 1040 also supports wireless data exchange between the dealer terminal 1002' and the wireless electronic lock 1004'. To support wireless communication, the dealer terminal 1002' includes a wireless interface 1042, and the wireless electronic lock 1004' includes a wireless interface 1042. The wireless interface 1042 and the wireless interface 1042 can interact over one or more wireless network links 1046. The wireless electronic lock 1004' is typically part of or coupled to a gaming support appliance.

FIG. 10C is a block diagram of a third locking configuration 1060 according to one embodiment. The third locking configuration 1060 includes a dealer terminal 1002" that is similarly configured as the dealer terminal 1002 illustrated in FIG. 10A. However, in the third locking configuration 1060, an electronic lock 1004" is integrated with or directly coupled to the dealer terminal 1002". Specifically, at least one actuator 1062 is coupled to the input/output interface 1012 of the dealer terminal 1002". In this embodiment, the electronic lock 1004" need only include the actuator 1062 as any processing, etc. can be done using the components of the dealer terminal 1002". Also, the electronic lock 1004" may also include at least one sensor 1064 is coupled to the input/output interface 1012 of the logistics management terminal 1002".

Additionally, an electronic lock can be embedded or integral with or coupled to a gaming support appliance. Examples of gaining support appliances are in electronic card shoe, an electronic chip rack and an electronic cash box. The electronic lock enables the dealer management system to control physical access to a gaming apparatus. For example, an electronic lock can control access to gaming supplies used by the gaming apparatus. Additionally, through electronic monitoring (if provided by electronic lock, electronic monitor or gaming support appliance), the dealer management system can also know and/or track gaming supplies.

Generally speaking, the electronic locks illustrated in FIGS. 10A-10C can coupled to the network link 1006, which enables data from an electronic lock (and/or an electronic monitor) to be provided to any component within a dealer management system. For example, an electronic lock can be controlled for various gaming apparatus from the dealer management server 102. Also, if monitoring is also provided by the electronic locks, then the monitored data from an electronic monitor can be provided to the dealer management server 102 for monitoring whether a re-supply is needed at any particular gaming apparatus associated with the electronic monitor.

Although an electronic lock can interact with electronic components within or supported by a gaming support appliance or a dealer terminal, an electronic lock can also directly communicate with any electronic component within a dealer management system, such as the dealer management server 102. Additionally, it should be understood that electronic locks can operate apart from a dealer terminal or a gaming support appliance.

Likewise, if an electronic monitor is also provided, it should be understood that the electronic monitor can interact with electronic components within or supported by a gaming support appliance or a dealer terminal. An electronic monitor can also directly communicate with any electronic component within a dealer management system, such as the dealer management server 102. Additionally, it should be understood that electronic monitors can operate apart from a dealer terminal or a gaming support appliance.

Figure 11A:
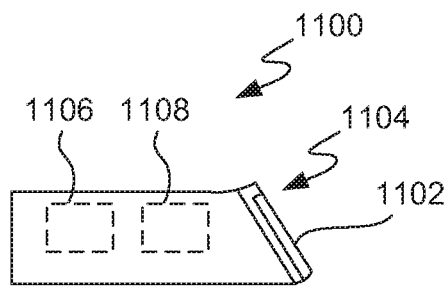
FIG. 11A illustrates an electronic card shoe according to one embodiment.

FIG. 11A illustrates an electronic card shoe 1100 according to one embodiment. The electronic card shoe 1100 is one example of a gaming support appliance. The electronic card shoe 1100 operates to hold plurality cards 1102 that can be serially output from an output end 1104. The electronic card shoe includes a lock mechanism 1106 that can inhibit cards from being removed from the electronic card shoe 1100. In addition to dispensing cards, the electronic card shoe 1100 can also monitor card counts, card images, card dealing, etc. The electronic card shoe 1100 can include an electronic monitor 1108 to facilitate such monitoring. As shown in FIG. 11A, the lock mechanism 1106 and the electronic monitor 1108 can be embedded in the electronic card shoe 1100. Alternatively, the lock mechanism 1106 and/or the electronic monitor 1108 can be external but proximate and coupled (e.g., attached) to the electronic card shoe 1100.

Figure 11B:
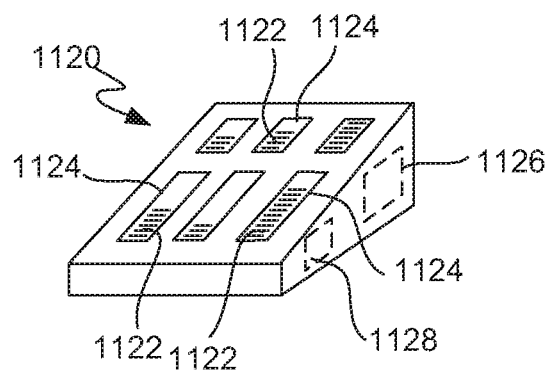
FIG. 11B illustrates an electronic chip rack according to one embodiment.

FIG. 11B illustrates an electronic chip rack 1120 according to one embodiment. The electronic chip rack 1120 is another example of a gaming support appliance. The electronic chip rack 1120 operates to hold various gaming chips 1122 of different denominations. The electronic chip rack 1120 includes recesses 1124 configured to hold the gaming chips 1122. The electronic chip rack 1120 can include a lock mechanism 1126 to restrict access to the gaming chips 1122 held in the electronic chip rack 1120. The electronic chip rack 1120 can also monitor counts of various chip denominations. The electronic chip rack 1120 can also include an electronic monitor 1128 to support such monitoring. The electronic chip rack 1120 can track a number of chips of various denominations provided in the electronic chip rack 1120. As shown in FIG. 11B, the lock mechanism 1126 and the electronic monitor 1128 can be embedded in the electronic chip rack 1120. Alternatively, the lock mechanism 1126 and/or the electronic monitor 1128 can be external but proximate and coupled (e.g., attached) to the electronic chip rack 1120.

Figure 11C:
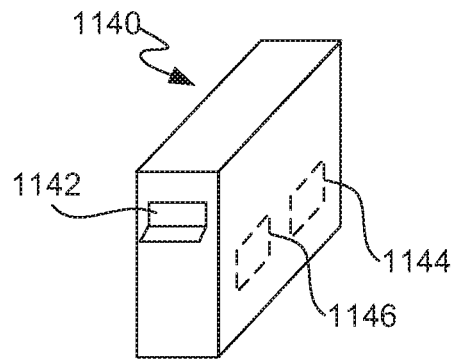
FIG. 11C illustrates an electronic cash box according to one embodiment.

FIG. 11C illustrates an electronic cash box 1140 according to one embodiment. The electronic cash box 1140 is still another example of a gaming support appliance. The electronic cash box 1140 can track quantities of currency that has been deposited into the electronic cash box 1140. The electronic cash box 1140 operates to securely store cash that has been inserted into the electronic cash box 1140 via a deposit slot 1142. The electronic cash box 1140 can also include an electronic monitor 1144. As shown in FIG. 11C, the electronic monitor 1144 can be embedded in the electronic cash box 1140. The electronic cash box 1140 can also include a lock mechanism 1146 that can be controlled to lock the electronic cash box 1140, which serves to prevent deposits to the electronic cash box 1140. Alternatively, the lock mechanism 1146 and/or the electronic monitor 1144 can be external but proximate and coupled (e.g., attached) to the electronic cash box 1140.

An electronic gaming system, gaming management system or fulfillment system can be implemented or embodied in various ways. Examples of several embodiments are illustrated below in FIGS. 12-16. Features of various different embodiments discussed herein can be combined as desired.

Figure 12A:
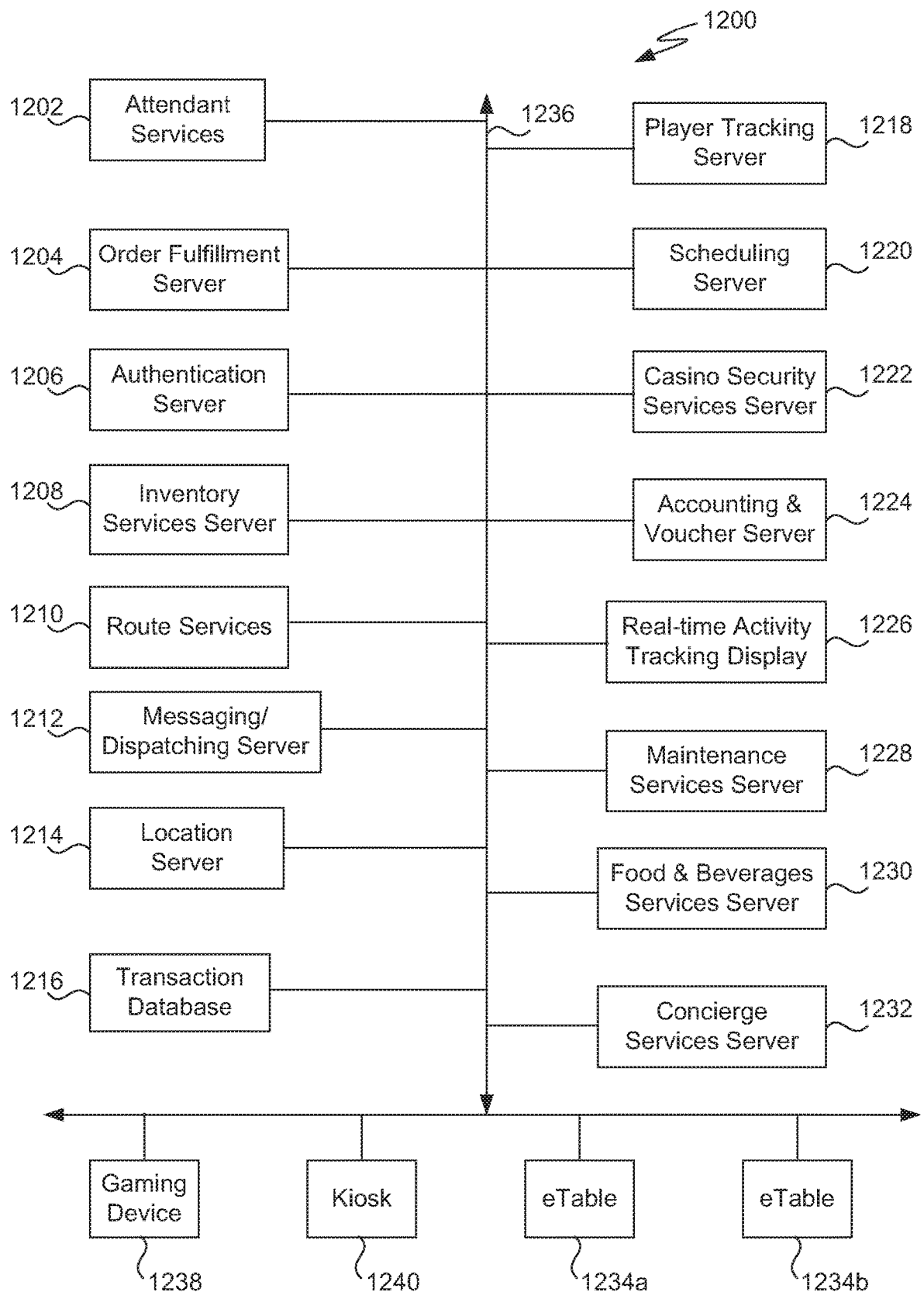
FIG. 12A illustrates a block diagram of an exemplary gaming management system according to one embodiment.

FIG. 12A illustrates a block diagram of an exemplary gaming management system 1200 according to one embodiment. The gaming management system 1200 serves to authenticate, authorize, monitor, and schedule dealers; lock/un-lock gaming apparatus of a gaming establishment; and/or initiate, monitor, manage, and complete fulfillment of supplies, services, and requests within a gaming environment. The gaming management system 1200 includes a network 1236. The network 1236 may be in communication with various servers and resources discussed below. Additionally, network 1236 may be a global network, a local area network, and/or any combination of wired and/or wireless networks.

The gaming management system 1200 may include an order fulfillment server 1204 in communication with network 1236. The order fulfillment server 1204 may be similar to a logistic management server discussed herein. Order fulfillment server 1204 may provide the backend processing for the gaming management system 1200. Order fulfillment server 1204 may support a plurality of gaming apparatuses such as gaming device 1238, kiosk 1240, eTables 1234a-1234b, and the like. The gaming apparatuses 1238, 1240, 1234a and 1234b can pertain to a game of chance, such as a wager-based game or a skill-based game, or some combination thereof. Examples of gaming apparatus include gaming tables, slot machines, portable gaming devices, and the like.

Order fulfillment server 1204 may receive, transmit, and manage any services and/or requests required within the gaming environment. For example, services and requests may be to fulfill a drink order, clean up a spill at a location within the gaming environment, manage a win at a slot machine, change cards at a card table, replace dice at a crap table, and any other services within the gaming environment. Those of ordinary skill in the art will know understand and know that services and/or requests may vary from food and beverage services, gaming services, inventory services, entertainment services, customer services, maintenance services, and the like.

When services are required, a request may be transmitted to order fulfillment server 1204 by a casino employee and/or a customer. For example, a black jack table may need additional chips. The request for additional chips at a table game may be transmitted to order fulfillment server 1204 via a gaming support appliance 110a–n, as discussed with reference to FIG. 1. The request may be automatically transmitted by the gaming support appliance or requested by the dealer or pit boss.

In one embodiment, the request may be authenticated by authentication server 1206. In this example, a dealer requesting chips may be required to provide authentication information to ensure that the chips are being requested by a dealer at a black jack table and not a thief trying to steal the chips. In another embodiment, the request may be automatically generated by gaming support appliance, such as gaming support appliance 110a–n in FIG. 1. Thus, authentication of the gaming support appliance may be performed by authentication sever 1206. Authentication may be completed by any known means such as fingerprint reader, employee card reader, eye scanner, facial and/or voice recognition devices, password log-in information, and the like.

Once authentication of the dealer and/or gaming support appliance is completed, the request can cause a voucher request for the chips to be transmitted to accounting and voucher server 1224. Accounting and voucher server 1224 may generate a voucher for the chips. The vouchers may be physical (e.g., paper) or digital vouchers.

The order fulfillment server 1204 may transmit the request to inventory services server 1208 to notify a proper gaming environment department of the request. In this example, the inventory services server 1208 may notify a gaming establishment cashier of the request for additional chips. Inventory services sever 1208 may store an inventory of chips and/or other necessary gaming paraphernalia (i.e., cards, money, and the like) that is housed in each location within the gaming environment. Therefore, obtaining the necessary items will be efficient and loss of the items (e.g., supplies) may be tracked. For example, an attendant would be directed to go to a cashier cage that has enough chips to fulfill the request.

Additionally, the order fulfillment server 1204 may determine the location of the black jack table from location server 1214. Location server 1214 may store a map of a gaming environment as well as location information for each of its gaming apparatuses 1238, 1240, 1234a and 1234b. Once the location of the black jack table is determined, an efficient and timely route to deliver the chips may be determined from route services 1210. This allows for timely service for the table to receive the chips, efficient use of an attendant's (i.e., gaming environment employee's) time, and ensure that no chips or monies are lost along the way. Route services 1210 may also store a map of the gaming environment and/or utilize the map of the gaming environment from location server 1214. Route services may then plan or map out an efficient route for the attendant to obtain and deliver the requested chips, which may cover the events such as pick up of a voucher, deliver the voucher to the cashier's cage in exchange for chips, and provide them to the appropriate table.

Messaging/dispatching services server 1212 may be similar to notification system 122 discussed with reference to FIG. 1. Messaging/dispatching services server 1212 may determine and schedule an attendant that is available to perform the services. This ensures that the gaming employees or attendants are not idle and will always have a task to complete. In this regard, messaging/dispatching services server 1212 may work with scheduling server 1220 to determine which attendant is working, which location the attendant is working at, and whether the attendant is on a break. In one example, scheduling server 1220 may determine that Attendant A is working from 9 am-12 pm with a break between 10 am-10:15 am. Scheduling server 1220 may also determine that Attendant A is working as a dealer at table 2 at 9 am and then at table 5 at 10:15 am.

Referring back to the example above, messaging/dispatching services server 1212 may be aware that the selected attendant is needed to be able to pick-up a voucher and present it to the nearest location housing the chips. The request for additional chips, along with an efficient route, may be presented on a computing device associated with the attendant, such as a portable computing device or smart phone, via attendant services server 1202. Attendant services server 1202 may manage which computing device is associated with which attendant as well as which attendant is able to complete which service.

In one embodiment, the location of the attendant may be tracked by location server 1214 and/or real-time activity tracking display 1226. Real-time activity tracking display 1226 may be in communication with gaming device 1238, kiosk 1240, and/or eTable 1234a-1234b to provide and present a visual display of the location of the attendant and also the chips being delivered by attendant. In other words, the dealer may see, via real-time activity tracking display 1226, when the attendant leaves the table, arrives at the cashier cage, leaves the cashier cages, and the route that is used to deliver the chips to the table.

Assuming an embodiment using vouchers, the attendant may pick-up the voucher at the table, such as a Black Jack table. In one embodiment, prior to receiving the voucher, the attendant may need to be authenticated by authentication server 1206. For example, the attendant may need to input authentication information into a computing device, such as a dealer management server or a gaming support appliance. This is to ensure that the voucher is being picked-up by a legitimate gaming environment employee and not a thief.

The attendant may thereafter present the voucher at a cashier's cage or any other location where the chips may be obtained. The voucher may be exchanged for the chips, which may be delivered to the black jack table following the efficient and timely route planned out by route services 1210. Once at the black jack table, the dealer and attendant may, in one embodiment, both again be authenticated by authentication server 1206 to ensure the chips are delivered to the proper location and/or persons.

Upon delivery and completion of the request, attendant, dealer, and/or both persons may submit a completion notification to transaction database 1216. Transaction database 1216 may be coupled to the order fulfillment server 1204 via fulfillment network 1236. The transaction database 1216 can provide storage for transaction data (e.g., records) associated with fulfillment of services, requests, or re-supplies to various gaming apparatus. The transaction data can provide a transaction log. The transaction data can be stored at the transaction database 1216 and can be utilized for ensuring that all transactions are carefully monitored and recorded for future review, audit, and the like.

In another example, a customer may want to order a beer while playing a wagering game of chance at a gaming device 1238 or eTable 1234a-1234b. The request for the beer, in one embodiment, may be entered by the customer into the gaming device 1238, kiosk 1240, or eTable 1234a-n. The request may be transmitted to order fulfillment server 1204. In yet another example, a customer may notice a spill on the gaming establishment floor and report the spill at a gaming device 1238 or kiosk 1240. The report may then be transmitted to order fulfillment server 1204 to request someone to clean it up.

When order fulfillment server 1204 receives a request, the request may then be transmitted to the appropriate server. For example, a request for a drink may be transmitted to the food and beverages service server 1230. The food and beverage service server 1230 may manage who and how the drink will be delivered to the customer. Upon receipt of the request, the food and beverage service server 1230 may determine the location of the customer from location server 1214. Location server 1214 may store a map of the gaming environment as well as location information for each of its gaming apparatuses 1238, 1240, 1234a-1034b. Once the location of the customer is determined, food and beverages services 1230 may communicate with route services 1210 to determine the most efficient and fastest route for an attendant to take to deliver the drink. This allows for timely service to the customer and efficient use of an attendant's (i.e., gaming environment employee's) time. Route services 1210 may also store a map of the gaming environment and/or utilize the map of the gaming environment from location server 1214. Route services may then plan or map out an efficient route for the attendant to use to reach the customer requesting the drink.

Once the most efficient and timely route is determined, the request, including the efficient and timely route, may be transmitted to messaging/dispatching services server 1212. In one embodiment, messaging/dispatching services server

1212 may be similar to notification system 122 discussed with reference to FIG. 1. Messaging/dispatching services server 1212 may determine and schedule an attendant that is available to prepare and deliver the drink to the customer. The request, along with the efficient and timely route, may be presented on a computing device associated with the attendant, such as a portable computing device, via attendant services server 1202. Attendant services server 1202 may manage which computing device is associated with which attendant as well as which attendant is able to complete which service. The attendant, upon receiving the request, may then prepare the drink and deliver it following the efficient and timely route.

In one embodiment, the location of the attendant may be tracked by location server 1214 and/or real-time activity tracking display 1226. Real-time activity tracking display 1226 may be in communication with gaming device 1238, kiosk 1240, and/or eTable 1234a-1034b to provide and present a visual display of the location of the drink. In other words, the customer at gaming device 1238 may see, via real-time activity tracking display 1226, when the drink exits the food and beverage location and the location of the attendant in route towards the customer.

Upon delivery of the drink and completion of the request, attendant may submit a completion notification to transaction database 1216. Transaction database 1216 may be coupled to the order fulfillment server 1204 via fulfillment network 1236. The transaction database 1216 can provide storage for transaction data (e.g., records) associated with fulfillment of services, requests, or re-supplies to various gaming apparatus. The transaction data can provide a transaction log. The transaction data can be stored at the transaction database 1216 and can be utilized for ensuring that all transactions are carefully monitored and recorded for future review, audit, and the like.

As stated above, those of ordinary skill in the art will understand and know that services and/or requests may vary from food and beverage services, gaming services, entertainment services, customer services, security services, inventory services, maintenance services, and the like. Order fulfillment server 1204 may manage each service request received. A request to help find a missing child may be transmitted to casino security services 1222. A request to clean up a spill may be transmitted to maintenance services server 1228. Request for concert tickets may be transmitted to concierge services server 1232. A request for a player tracking card replacement may be transmitted to player tracking services 1218.

Whatever the request, it may be transmitted to the proper server to fulfill the request by order fulfillment server 1204. When transmitted to the proper server, location server 1214 and route services server 1210 may be used to determine the most efficient, quickest, and fastest route for an attendant to use to fulfill the request. Authentication server 1206 may also be used to authenticate the attendant, gaming personnel (i.e., dealer, pit managers, cashier cage managers, and the like) to ensure nothing is stolen. Messaging/dispatch server 1212 may manage and determine which gaming personnel is best able to fulfill the request. This ensures that the gaming employees or attendants are not idle and will always have a task to complete. Attendant services 1202 may manage the devices associated with each attendant to ensure that the notifications are transmitted to the proper attendant that is able to complete the tasks and requests. Finally, each transaction, (e.g., route taken by the attendant, time of completion, and the like) may be stored in transaction database 1216.

Besides order fulfillment, the gaming management system 1200 can also operate to control access to the gaming device 1238, kiosk 1240, and/or eTable 1234a-1034b by users, such as dealers, or access to gaming supplies used by such devices. The gaming management system 1200 can include a dealer management server 1242. In one embodiment, the dealer management server 1242 can correspond to the dealer management server 102 illustrated in FIG. 1. The dealer management server 1242 couples to network 1036 and can access other components of the gaming management system 1200 in operating to authenticate, authorize, monitor, alert and/or schedule dealers. For example, the dealer management server 1242 can be assisted with (i) authentication by the authentication server 1206, (ii) communication by the messaging/dispatching server 1212, (iii) scheduling by the scheduling server 1220. In general, the dealer management server 1242 can, for example, perform any of the function discussed above concerning the dealer management server 102, 300.

Additionally, the gaming device 1238, kiosk 1240, and/or eTable 1234a-1034b can include or couple to a lock mechanism that can be controlled by the dealer management server 1242, or other server, to initiate lock or un-lock of the respective gaming device 1238, kiosk 1240, and/or eTable 1234a-1034b. For example, such devices can be locked by inhibiting access to gaming supplies utilized by such devices.

Figure 12B:
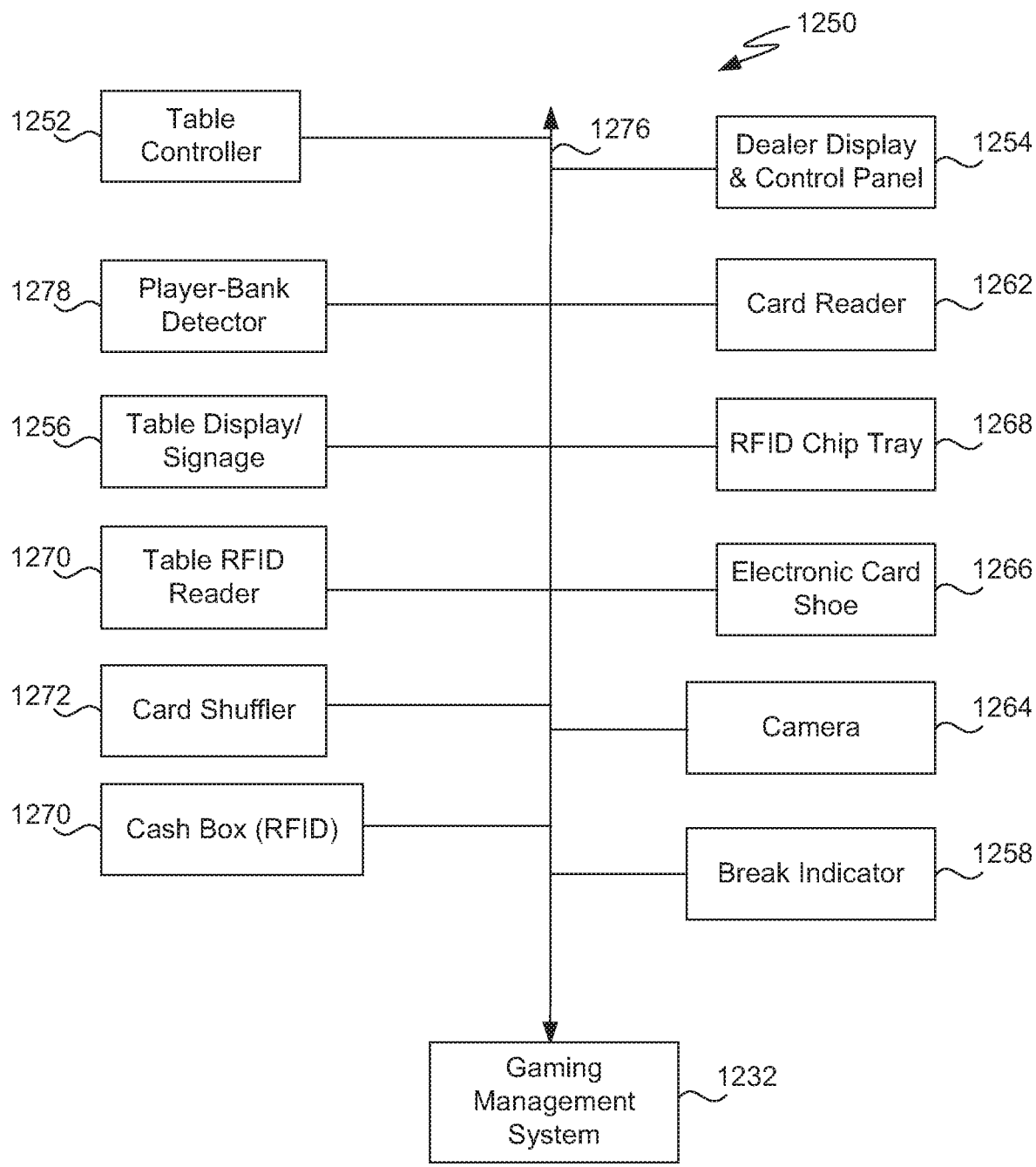
FIG. 12B is a gaming apparatus according to one embodiment.

FIG. 12B is a gaming apparatus 1250 according to one embodiment. The gaming apparatus 1250 includes various components that operate to facilitate playing of a wager-based game by one or more players. Often, the wager-based game is a card game and the gaming apparatus 1250 provides a table for providing a playing surface. The gaming apparatus 1250 can also include various electronic components to support playing and/or managing play of wager-based games at the gaming apparatus 1250.

The gaming apparatus 1250 can include a table controller 1252. The table controller 1252 can control overall operation of the gaming apparatus 1250. For example, the table controller 1252 can monitor games, cards, chips, dealers and/or players as well as receive and send data to a remote gaming management system 1274 via a network. 1276. The gaming apparatus includes various electronic components that can couple to the table controller 1252 via the network 1276. The network 1276 can be wired and/or wireless, and can include one or more networks. Typically, the gaming management system 1274 is associated with an establishment where the gaming apparatus 1250 is present. The table controller 1252 can also participate in controlling access (by dealers or others) to the gaming apparatus 1250 and or its associated gaming supplies. In other words, the table controller 1252 can lock and unlock the gaming apparatus. In one embodiment, the gaming apparatus 1250 can provide the various operational states illustrated in the dealer authorization and monitoring system 200 shown in FIG. 2.

The gaming apparatus 1250 can include a dealer display and control panel 1254. The dealer display and control panel 1254 can, for example, correspond to the dealer terminal 114a-n discussed above regarding FIG. 1. The dealer display and control panel 1254 can provide a control panel that a dealer can interact with to operate the gaming apparatus 1250. In one implementation, the dealer display and control panel 1254 can be a touch screen control panel. The dealer display and control panel 1254 can enable the dealer to login or authenticate, deal, request or exchange gaming supplies, order other services for the dealer or patrons (e.g. beverage requests), and the like.

The gaming apparatus 1250 can also include a table display/signage 1256. The table display/signage 1256 can be implemented as a community display that can display information to persons, such as players, and/or managers of dealers (e.g., pit bosses). As an example, the dealer shift change (or lockout) timer, betting timer or other information that may be of interest could be display on the table display/signage 1256.

The gaming apparatus 1250 can also include a break indicator 1258. For example, the break indicator 1258 can represent a visual indicator, such as a light (e.g., LED light), provided at the gaming apparatus 1250. The break indicator 1258 can clearly indicate whether or not the dealer at the gaming apparatus 1250 is on a break. The break indicator 1258 can be provided at the gaming apparatus 1250 at one or more different positions. As one example, the break indicator 1258 can be provided on an electronic card shoe. As another example, the break indicator 1258 can be integral with the dealer display and control panel 1254. As still another example, the break indicator 1258 can be a stand-alone visual indicator, such as an LED light bar, that is controlled by the table controller 1252.

The gaming apparatus 1250 can also include an electronic card shoe 1266 and a RFID chip tray 1268. The electronic card shoe 1266 can contain and release cards that are used in playing a wager-based card game at the gaming apparatus 1250. In one embodiment, the electronic card shoe 1266 can provide a locking function that can prevent cards from being removed (i.e., dealt), such as to control when the cards can be removed from the electronic card shoe 1266. For example, the electronic card shoe 1266 can be placed in a locked condition in which unauthorized users are unable to make use of cards from the electronic card shoe 1266. In one embodiment, the electronic card shoe 1266 can include a card reader 1262. The card reader 1262 is able to optically read the cards being removed (i.e., dealt) from the electronic card shoe 1266. The data captured by the card reader 1262 can be provided to the table controller 1252 for monitoring of the distribution of cards from the electronic card shoe 1266 in conjunction with playing of the wager-based card games at the gaming apparatus 1250. The RFID chip tray 1268 is one implementation of an electronic chip tray that can electronically monitor quantities of chips, markers, money, tokens, and the like within the electronic chip tray. The RFID chip tray 1268 can also be coupled to the table controller 1252. In one embodiment, the RFID chip tray 1268 can be covered and/or locked to inhibit access to the items within the electronic chip tray, such as during lockdown of the gaming apparatus 1250.

The gaming apparatus 1250 can further include the table RFID reader 1270. The table RFID reader 1270 can be provided at the gaming apparatus 1250, which can include a gaming table. The table RFID reader 1270 can utilize short range radio signals to monitor game play and/or gaming supplies at the gaming apparatus 1250. The table RFID reader 1270 can include or interact with the RFID chip tray 1268.

The gaming apparatus 1250 can include a cash box 1270 that can receive and store cash. In one embodiment, the cash box 1270 can be a RFID cash box. The cash box 1270 can include a lockout function to prevent utilization of the cash box 1270 by unauthorized users or unauthorized times. The cash box 1270 can be controlled by the table controller 1270.

The gaming apparatus 1250 can also include at least one camera 1264. The camera 1264 can be utilized record game status as well as to monitor gaming supplies, such as chips and cards, with respect to the gaming apparatus 1250. The camera can also be utilized to receive or archive player decisions, monitor card shuffling, monitor game play, etc.

The gaming apparatus 1250 can further include a card shuffler 1272. The card shuffler 1272 can operate to automatically shuffle cards for use at the gaming apparatus 1250. For example, in one implementation, the gaming apparatus 1250 includes a gaming table in which a wager-based card game is played. The card shuffler 1272 can shuffle the cards in an automated fashion. The card shuffler 1272 can also be coupled to or integrated with the electronic card shoe 1266.

Further still, in one embodiment, the table controller 1252 can also provide player-banker monitoring. In this regard, the gaming apparatus can include a player-bank detector 1278. The player-bank detector 1278 can operate to detect which player is acting as a player-bank for a wager-based game that uses a player-banker. The player-banker detector 1278 can utilize various different mechanisms. As one example, a RFID button/token can be utilized to denote a player-banker's position. As another example, a manual dealer input can be utilized to denote a player-banker's position, such as using the dealer display and control panel 1254. The player-banker detector 1278 can also implement a timing monitor that can determine how long a particular player serves as the player-banker.

Additionally, the gaming apparatus 1250 can also include one or more input components. In input component can be made available to a dealer or player. For example, a dealer can utilize an input component to login for authentication purposes. The input component can be coupled to the gaming apparatus 1250 in general, or can be coupled to a particular component thereof, such as the electronic card shoe 1266. The dealer can utilize the input component to login. For example, the input component can use a PIN entry, biometric reader, a magnetic card/fob reader, RFID token reader, and the like.

Figure 13:
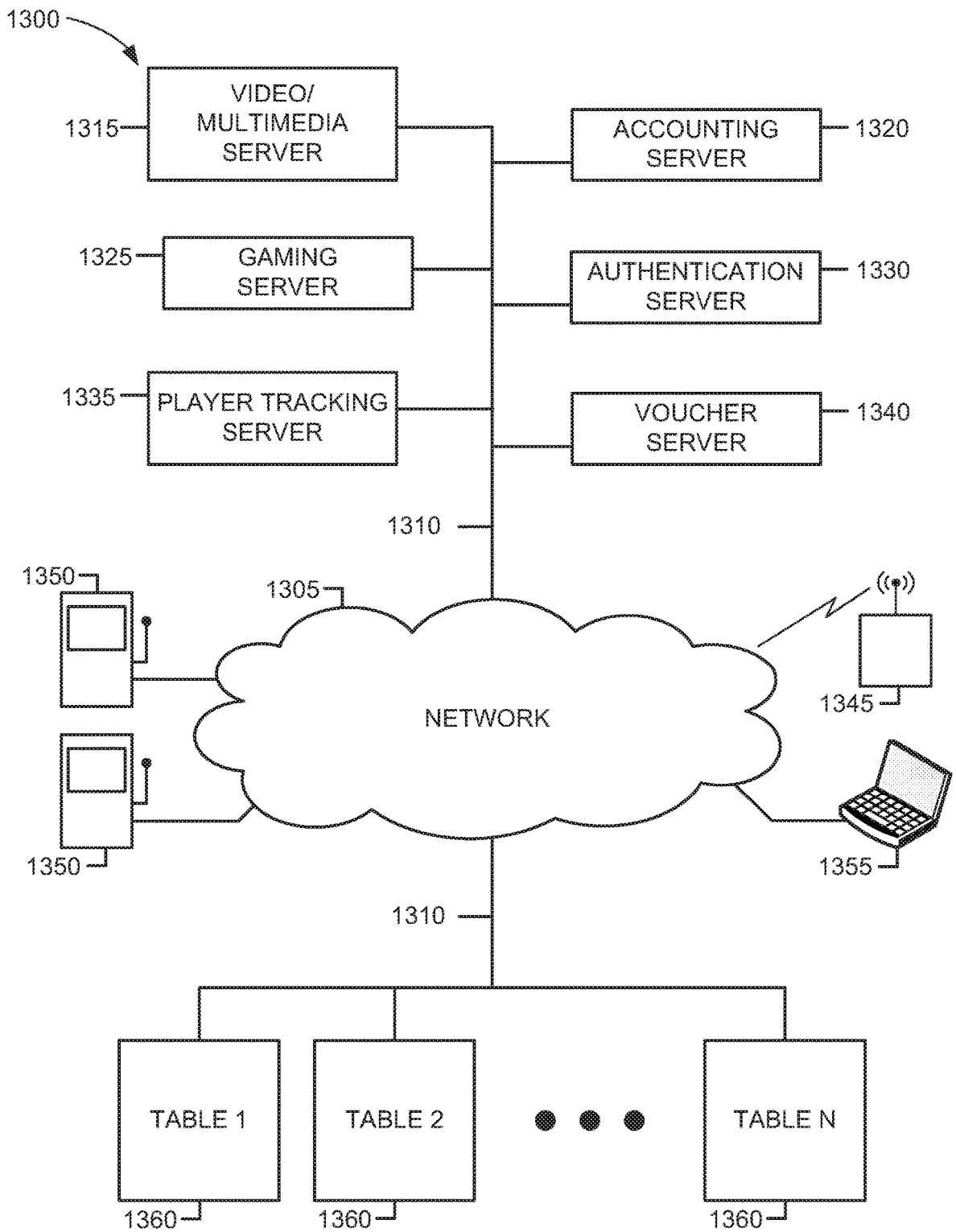
FIG. 13 illustrates an electronic gaming system according to one embodiment.

FIG. 13 illustrates an electronic gaming system 1300 according to one embodiment. The electronic gaming system 1300 may include electronic gaming tables 1360, which may be coupled to a network 1305 via a network link 1310. The electronic gaming tables 1360 may be gaming tables with enhanced electronic capabilities. The network 1305 may be or include one or more of a public and a private network. One or more video streams may be received at a video/multimedia server 1315 from the gaming tables 1360. The video/Multimedia server 1315 may transmit one or more of these video streams to a mobile device 1345, a gaming device 1350, a laptop 1355, and/or any other remote electronic device. The video/Multimedia server 1315 may transmit these video streams via network link 1310 and network 1305.

The electronic gaming system 1300 may include an accounting/transaction server 1320, a gaming server 1325, an authentication server 1330, a player tracking server 1335, and a voucher server 1340.

The accounting/transaction server 1320 may compile, track, store, and/or monitor cash flows, voucher transactions, winning vouchers, losing vouchers, and/or other transaction data for the casino operator and for the players. Transaction data may include the number of wagers, the size of these wagers, the date and time for these wagers, the identity of the players making these wagers, and the frequency of the wagers. The accounting/transaction server 1320 may generate tax information relating to these wagers. The accounting/transaction server 1320 may generate profit/loss reports for predetermined gaming options, contingent gaming options, predetermined betting structures, and/or outcome categories.

The gaming server 1325 may generate gaming options based on predetermined betting structures and/or outcome categories. These gaming options may be predetermined gaming options, contingent gaming options, and/or any other gaming option disclosed herewith.

The authentication server 1330 may determine the validity of vouchers, players' identity, and/or an outcome for a gaming event.

The player tracking server 1335 may track a player's betting activity, a player's preferences (e.g., language, drinks, font, sound level, etc.). Based on data obtained by the player tracking server 1335, a player may be eligible for gaming rewards (e.g., free play), promotions, and/or other awards (e.g., complimentary food, drinks, lodging, concerts, etc.).

The voucher server 1340 may generate a voucher, which may include credit data or data relating to gaming options. For example, a voucher can be provided that represent a credit value and can be redeemed for game play or cash out. As another example, data relating to the structure (e.g., 6 out of the next 10 rolls at craps table 4 will be a 7 or 11) may be generated. If there is a time deadline, that information may be generated by the voucher server 1340. Vouchers may be physical (e.g., paper) or digital.

Figure 14:
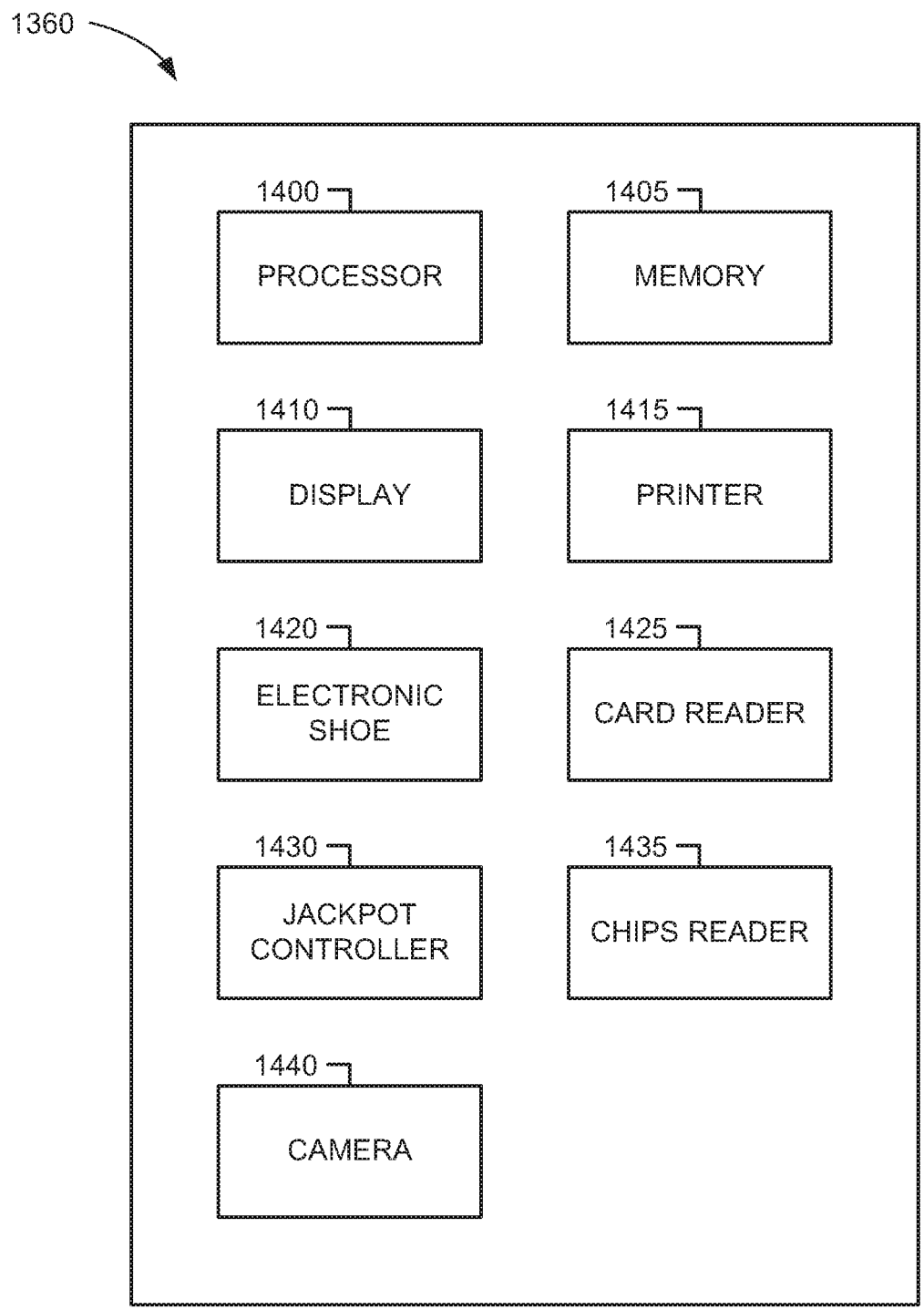
FIG. 14 shows electronic gaming table with various features, according to one embodiment.

FIG. 14 shows electronic gaming table 1360 with various features, according to one embodiment. The electronic gaming table 1360 may include a processor 1400, a memory 1405, a display 1410, a printer 1415, an electronic shoe 1420, a card reader 1425, a jackpot controller 1430, a chips reader 1435, and a camera 1440.

The processor 1400 may be communicatively coupled to any other device in the electronic gaming table 1360. The processor 1400 via an interface may communicate, wired or wireless, with any of the elements of the electronic gaming system 1100.

The memory 1405 may include data relating to gaming events, video streams transmitted from the electronic gaming table 1360, winning and losing percentages for gaming options relating to the electronic gaming table 1360, and game management data (e.g., dealer schedule, chip refills, etc.).

The display 1410 may show previous game results, a betting structure, outstanding bets, transaction volume, present value of betting options, a table minimum bet, a table maximum bet, or any other video data.

The printer 1415 may generate vouchers, promotional items, food tickets, event tickets, chip/cash vouchers, card vouchers and/or lodging tickets. Vouchers may be physical (e.g., paper) or digital.

The electronic shoe 1420 may obtain data and/or images of gaming objects utilized with gaming table 1360. This data and/or images may be transmitted to electronic gaming devices and displayed as images from table games. For example, on a blackjack table a ten of spades may be dealt to a player. This information is obtained via the electronic shoe 1420 and utilized to generate an image and/or illustration of a ten of spades card by electronic gaming system 1100, which maybe shown as images from table games displayed at gaming tables 1360 and/or mobile device 1145, a gaming device 1150, a laptop 1155. In another example, electronic shoe 1420 may receive data relating to the numbers on dice, transmit this data to electronic gaming system, which may be utilized to generate an image/illustration of the dice by electronic gaming system (e.g., images from table games displayed at gaming tables 1360 and/or mobile device 1145, a gaming device 1150, a laptop 1155.).

The card reader 1425 may provide identification, authentication, and application processing functions. The card reader 1425 may interface with smart cards, magnetic striped card, bar code reader, RFID card, and the like.

The jackpot controller 1430 may track and compile data associated with a jackpot. The jackpot controller 1430 may award the jackpot on a specific occurrence (e.g., dealing a royal flush) and/or randomly award a jackpot.

The chips reader 1435 may compile and track data associated with the amount of chips one or more players possesses, the amount of chips won/lost at the gaming table 1360, the amount of chips in the dealer's rack at the gaming table 1360, an amount of chips bet by one or more players, amount of chips in the betting pool, and/or any combination thereof.

The camera 1440 may obtain data from the gaming table 1360. The camera 1440 may be one or more cameras located to view the gaming objects (e.g., cards, dice, dominos, ball, wheel, etc.), the dealer, the shoe, the players' hands, the players, and/or any combination thereof. The camera 1440 may transmit this data to the gaming table 100, which may be utilized to generate an image/illustration of the gaming objects.

As discussed herein, a fulfillment system, such as the dealer management system 100, may be applied in a live table system that monitors a live table game in which physical or virtual cards are dealt to one or more players at a gaming table, or other physical game components are employed such as dice, and collects the randomly generated game play data. The game play data collected is used to enable play of the same live table game remotely through gaming terminals. The gaming terminals may be any platform capable of receiving and transmitting data, including "thin-client" platforms or platforms which do not process game play data and "smart" platforms or platforms which process game play data. The gaming terminal maybe stationary, similar to the slot machines or electronic tables commonly seen at the physical casino, or maybe portable electronic devices such as smart phones, computer tablets, portable media players, laptop computers, desktop computers, smart TV, and the like. Additionally, the gaming network they attach to can be of wired (Ethernet, Token Ring, Serial multidrop, etc.) or wireless variety (802.11x, BlueTooth, LTE, 2G/3G/4G cellular, Zigbee, Ultra Wide Band, etc.) known in the art. It should be appreciated that players interested in placing wagers on a live-table game not be confined to the gaming table or even the casino floor.

Figure 15:
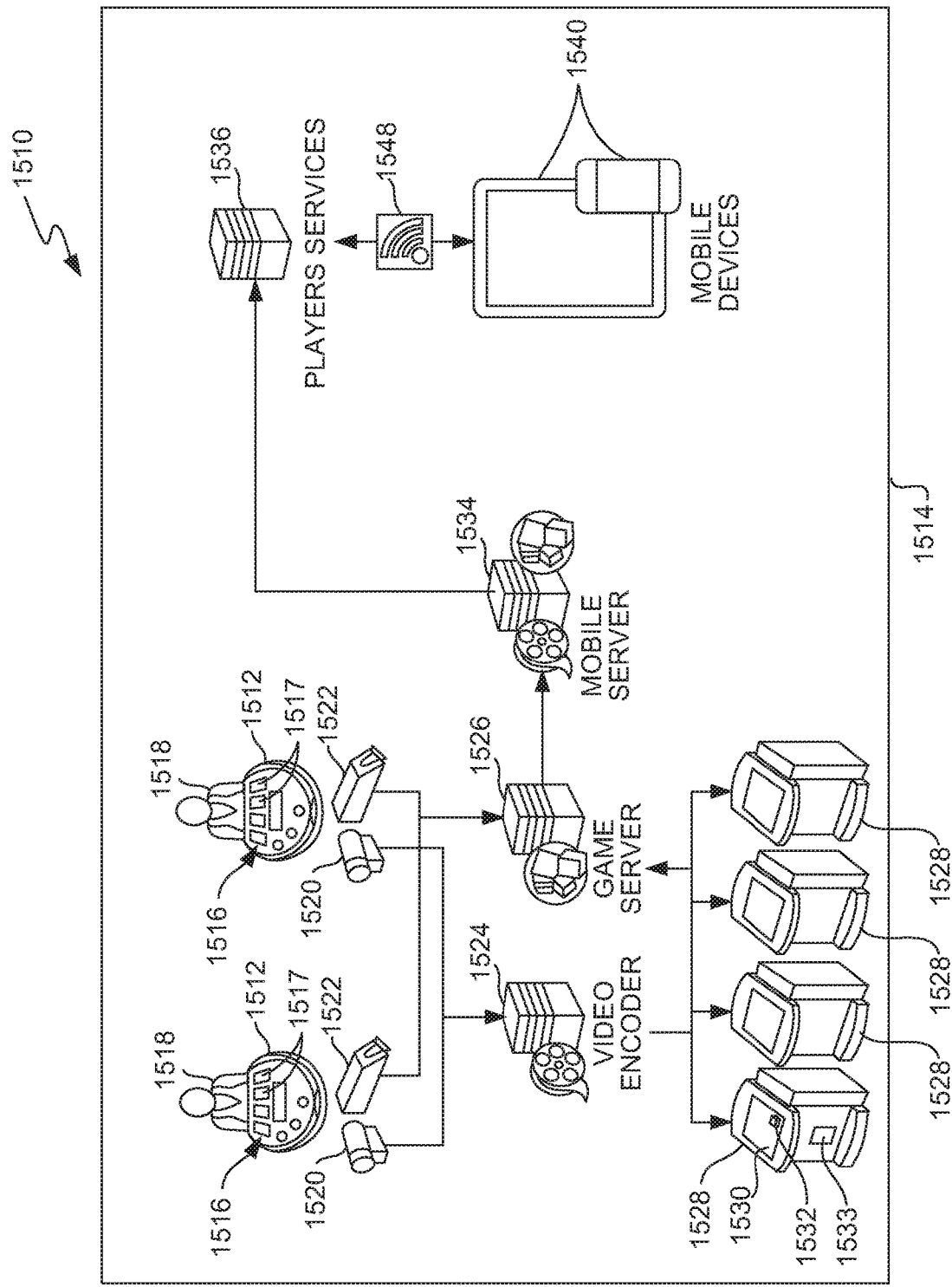
FIGS. 15 and 16 illustrate one embodiment of a system for providing multiple synchronous games for multiple plays from a live table game.
Figure 16:
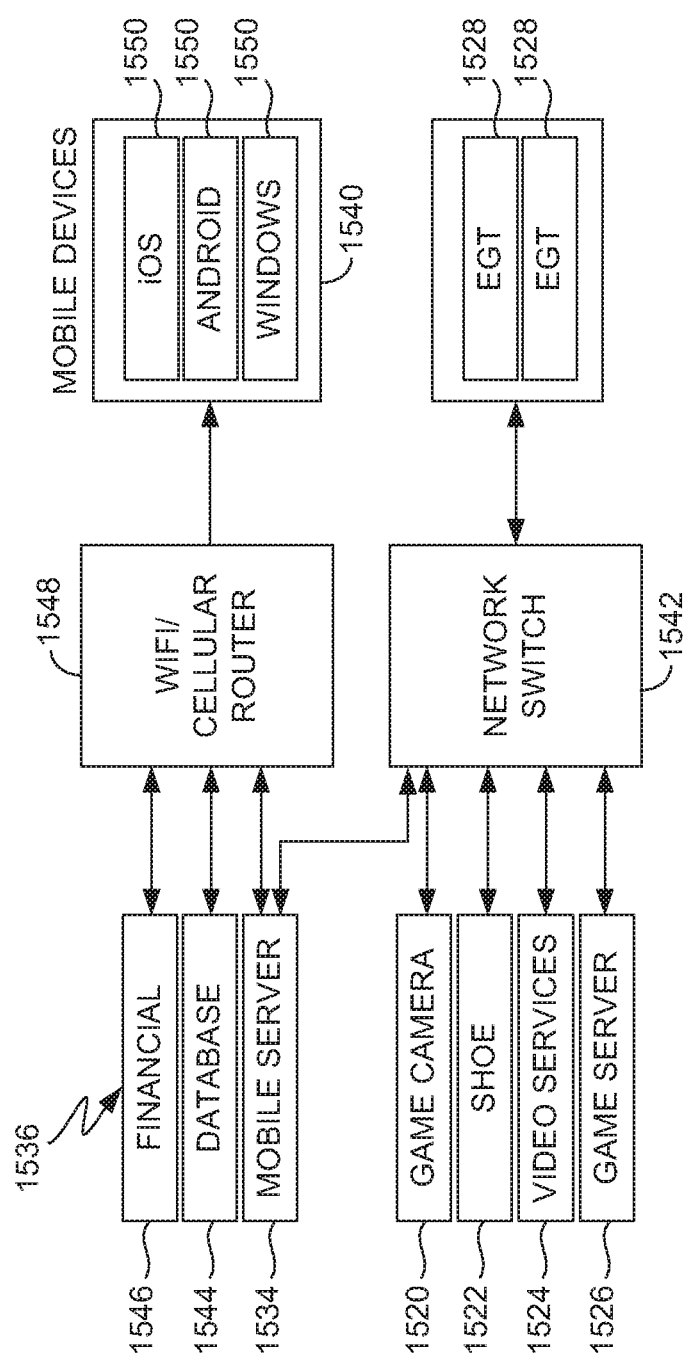

FIGS. 15 and 16 illustrate one embodiment of a system 1510 for providing multiple synchronous games for multiple plays from a live table game. In the illustrated embodiment, the system 1510 includes at least one physical game table 1512 located in a live play area or gaming space such as a casino 1514. The system 1510 also includes a physical game system, generally indicated at 1516, for playing a live table game in connection with the physical game table 1512 to generate a single live game data sequence by a live dealer 1518 operating the physical game system 1516. In one embodiment, the system 1510 may include one or more physical game tables 1512, one or more physical game systems 1516, and one or more live dealers 1518. The physical game system 1516 includes as least one of the following: (i) an electronic card shoe, a shoe controller, a plurality of physical cards, a dealer display, and a network interface for a card game; (ii) a wheel, a controller, a ball, a ball drop sensor, a dealer display, and a network interface for a roulette game; (iii) a set of dice, a controller, a dealer display, and a network interface for a dice game; and/or (iv)

a plurality of spinning reels, a controller, a dealer display, and a network interface for a slot game. In the embodiment illustrated, the physical game system 1516 includes a plurality of physical cards 1517 for a card game such as Baccarat and an electronic card shoe 1522. It should be appreciated that the physical cards 1517 are shuffled and loaded into the electronic card shoe 1522 for dealing to play the card game. It should also be appreciated that one live dealer 1518 may operate one or more live table games on the physical game table 1512 in connection with one or more physical game systems 1516, each physical game system 1516 generating a single live game data sequence. For example, a physical game table 1512 may have two physical game systems 1516, such as, an electronic shoe system 1522 for a card game, and an electronic roulette wheel system (not shown) for a roulette game. Both the card game and the roulette game systems may be operated by the same live dealer 1518, such as in an alternating manner. It should further be appreciated that the live game data sequence is, for one example, the order in which the physical cards 1517 are dealt or, for another example, the spinning of the roulette wheel, dropping the ball on the wheel, and the ball finally resting on one spot of the wheel. Specific components of the system 1510 may be referenced using functional terminology in their names. The function terminology is used solely for purposes of naming convention and to distinguish one element from another in the following discussion. Unless otherwise specified, the name of an element conveys no specific functionality to the element or component. It should be appreciated that, in selected embodiments, the software, hardware, and associated components of the system 1510 may be programmed and configured to implement one or more embodiments described herein. It should also be appreciated that the various aspects of the system 1510 may be exemplified as software, modules, nodes, etc. of a computer or server.

Referring to FIGS. 15 and 16, the system 1510 also includes at least one camera 1520 for recording video of the single live game data sequence generated by the physical game system 1516. In the embodiment illustrated, there are two cameras 1520 with one camera 1520 for each live dealer 1518. The camera 1520 may be positioned in a variety of locations to capture all the gaming activity occurring at the physical game table 1512, the dealer 1518 playing the physical game system 1516 in connection with the game table 1512, or just the hands of the dealer 1518 playing the physical game system 1516 in connection with the game table 1512. For example, the camera 1520 may be situated above the game table 1512, pointed toward the dealer 1518, or placed inside or under a rim of the game table 1512 and directed toward the center of the table 1512 (to capture a dealt card that is viewed by the dealer 1518). In another embodiment, multiple cameras 1520 may be used, each focusing on one aspect of the physical table game 1512. For example, one camera 1520 may be positioned to capture the live dealer 1518, another camera 1520 may be pointed at the card shoe 1522, and yet another camera 1520 may be zoomed in to the dealt cards on the physical game table 1512. Each camera 1520 records a live video feed of game-play at the game table 1512, which is transmitted over a network shown in FIG. 16. The live feed may include a digital or analog signal representing gaming action captured by the camera 1520. It should be appreciated that the camera 1520 provides a live broadcast of the game actions at the physical table game 1512 to the one or more game terminals 1528. It should also be appreciated that this video stream is normally for informational purposes only (e.g., the players can verify that the dealer operate the game correctly). It should still further be appreciated that a more detailed description of a live dealer game is disclosed in U.S. Pat. No. 8,348,763 to Moshal et al., the entire disclosure of which is hereby expressly incorporated by reference.

The system 1510 includes at least one of a video encoder and/or a video transcoder 1524 in communication with the at least one camera 1520. In the embodiment illustrated, there are two video encoders/transcoders 1524 in communication with the two cameras 1520, one video encoder/transcoder 1524 being associated with one camera 1520 for each live dealer 1518. It should be appreciated that the video encoder/transcoder 1524 encodes the digital video from the camera 1520 to meet proper formats and specifications for recording and broadcasting through the use of video broadcasting systems.

The system 1510 also includes a game server 1526 in communication with at least one physical game system 1516 to receive the single live game data sequence and generate multiple synchronous games from the single live game data sequence. In one embodiment, the game server 1526 includes a processor 1527*a* and a memory 1527*b* for storing rules, logic, and payout tables of the multiple synchronous games and applies the rules, logic, and payout tables to the single live game data sequence to generate the multiple synchronous games. The game server 1526 may also include a database 1544 for storing information or be coupled to a database 1544 to access information. The game server 1526 is in communication with the one or more physical game systems 1516. In the illustrated embodiment, the game server 1526 is coupled to each electronic card shoe 1522 via a communications link such as a network switch that enables communication over a network, such as, for example, the Internet, a cellular telecommunications network, a wireless network and/or any suitable communication network. It should be appreciated that the gamer server 1526 is configured to carry out the methodologies described herein. It should also be appreciated that the game server 1526 may be programmed in a suitable language to carry out the methodologies. The game server 1526 may be arranged in a variety of configurations and may include a communication interface that receives and transmits game play data which is randomly generated as a result of playing the live table game, a processor that facilitates comparing the live game data with the rules and/or criteria for winning the wagers stored in data storage and determines an outcome of the wagers placed on the live table game via a data communication device of the electronic gaming terminal 1528. The game server 1526 is configured to receive the one or more wagers on the multiple synchronous games from the one or more electronic game terminals 1528, to provide the multiple synchronous games to the one or more electronic gaming terminals 1528 synchronously, to determine the results or outcomes of the multiple synchronous games, to resolve the one or more wagers on the multiple synchronous games synchronously from the one or more electronic game terminals 1528, and to payout rewards on the multiple synchronous games to the one or more electronic game terminals 1528. It should be appreciated that the game server 1526 may perform functions described below by executing computer-readable program instructions stored in data storage to enable a plurality of electronic gaming devices to each play a separate instance of one or more live dealer games, to determine the outcome of game-play decisions and game results at a live dealer game, to transmit the game results to one or more electronic gaming terminals 1528 to be described, to operate in conjunction with a larger online gaming system (e.g., a separate gaming server, an online casino website, or a web server), or to manage a remote player's credit account, for example. It should be appreciated that the electronic gaming terminal 1528 may be of the type disclosed in U.S. Patent Pub. US20160012663 A1, published Jan. 14, 2016 and U.S. application Ser. No. 14/864,334, filed Sep. 24, 2015, the entire disclosure of which is hereby incorporated by reference.

The system 1510 further includes one or more electronic gaming terminals 1528 in communication with the game server 1526. Each of the electronic gaming terminals 1528 has a display 1530 to display the multiple synchronous games from the game server 1526 and an input mechanism 1532 to input one or more wagers on the multiple synchronous games. In the illustrated embodiment, each electronic gaming terminal 1528 includes a controller 1533 that is coupled to the display 1530 and the input mechanism 1532 and a communications device (not shown). The controller 1533 receives and transmits information to and from the game server 1526 and displays the games and the graphical interfaces on the display 1530 to enable a player or user to interact with the game server 1526 to play the games in accordance with the embodiments described herein. The display 1530 includes, without limitation, a flat panel display, such as a cathode ray tube display (CRT), a liquid crystal display (LCD), a light-emitting diode display (LED), active-matrix organic light-emitting diode (AMOLED), a plasma display, and/or any suitable visual output device capable of displaying graphical data and/or text to a user. Moreover, the input mechanism 1532 includes, without limitation, buttons, a keyboard, a keypad, a touch-sensitive screen, a scroll wheel, a pointing device, a barcode reader, a magnetic card reader, a radio frequency identification (RFID) card reader, an audio input device employing speech-recognition software, gestures, and/or any suitable device that enables a user to input data into the controller 1533 and/or to retrieve data from the controller 1533. It should be appreciated that a single component, such as a touch screen, a capacitive touch screen, and/or a touchless screen, may function as both the display 1530 and as the input mechanism 1532. It should also be appreciated that the display 1530 is configured to facilitate the entry of wagers, show a live multimedia feed of the table game being played and communicate the outcome of any wagers placed.

The system 1510 may include a mobile server 1534 in communication with the game server 1526 via the network switch 1542 to output the multiple synchronous games to one or more mobile devices 1540 to be described. The mobile server 1534 may be arranged in a variety of configurations and may include a processor and a communication interface that receives and transmits game play data from the game server 1526.

The system 1510 may include a player tracking server 1536 in communication with the mobile server and the one or more mobile devices to allow remote play of the multiple synchronous games and to track the remote play of the multiple synchronous games. The player tracking server 1536 provides games, accounting, and financial services for mobile players. The player tracking server 1536 may include memory for storage of a database 1544 for tracking games and player data and a financial database 1546 for storing financial data and for processing financial transactions related to the player wagering such as money transfers, deposits, withdrawals, balance monitoring, etc.

The system 1510 also may include a wireless or cellular router 1548 in communication with the mobile server 1534, player tracking server 1536, and one or more mobile devices 1540 that enables communication over a network, such as, for example, the Internet, a cellular telecommunications network, a wireless network and/or any suitable telecommunication network.

The system 1510 may further include one or more mobile devices 1540 in communication with the wireless router 1548. Each of the mobile devices 1540 has a display to display the multiple synchronous games from the game server 1526 and an input mechanism to input one or more wagers on the multiple synchronous games. The mobile device 1540 includes a processor operating system 1550 such as iOS, Android, or Windows. The processor operating system 1550 communicates with the mobile server 1534 and the player tracking server 1536 via the wireless router 1548 and the cellular telecommunications network and/or the Internet. In one embodiment, the mobile device 1540 may include a portable computer, laptop, cell phone, tablet computer, smart phone/tablet computer hybrid, personal/home video game device, personal data assistant, and/or any suitable computing device that enables a player to connect to the mobile server 1534 and the player tracking server 1536 and display the graphical interfaces.

Another aspect of describes herein pertains to monitoring player-banker of a wager-based game. Some regulations require that a player-banker not serve as banker for more that a predetermined period of time. By monitoring the duration that a player serves as the player-banker, such regulations can be complied with. The gaming apparatus described herein can electronically monitor the player-banker and secure compliance.

Figure 17:
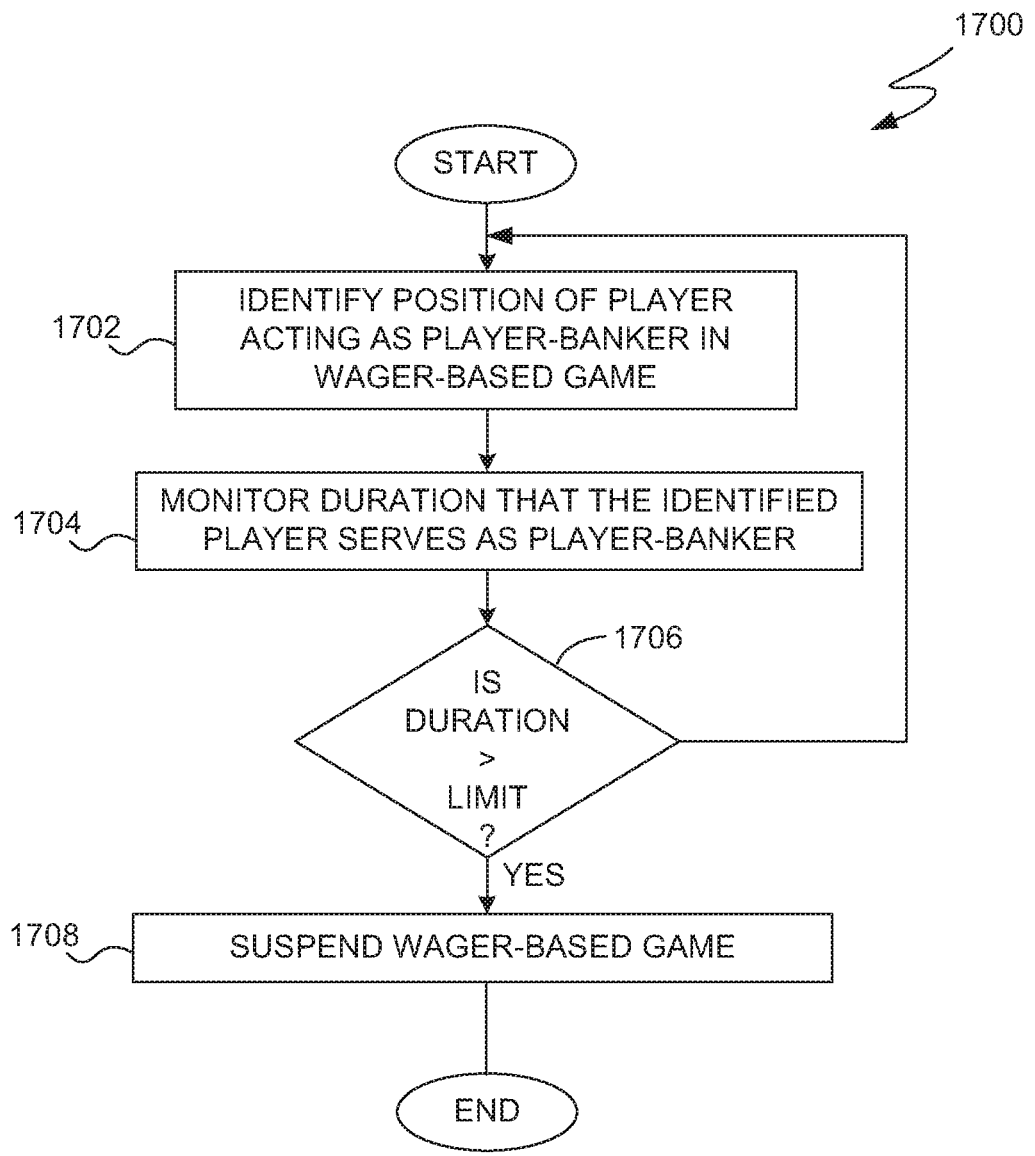
FIG. 17 is a flow diagram of a method for monitoring player-banker of a wager-based game.

FIG. 17 is a flow diagram of a method 1700 for monitoring player-banker of a wager-based game. The method 1700 can identify 1702 a position of a player acting as a player-banker in a wager-based game. This can be achieved manually (e.g., through a dealer input) or at least partially automatically by way of a marker/token (e.g., RFID marker/token). The wager-based game is a wager-based game in which one player serves as a player-banker. Hence, the identification 1702 serves to identify the position of the player that is serving as the player-banker for the wager-based game being performed at a gaming apparatus. Next, the method 1700 monitors 1704 a duration that the identified player serves as the player-banker. Thereafter, a decision 1706 can determine whether the duration is greater than a limit (e.g., predetermined time limit). For example, the limit may be one hour. When the decision 1706 determines that the duration does not exceed the limit, then the method 1700 can return to repeat the block 1702 so that the monitoring of the duration can continue. On the other hand, when the decision 1706 determines that the duration does exceed the limit, then the wager-based game can be suspended 1708. Typically, the wager-based game would only be temporarily suspended until a new player-banker is identified and utilized. As an example, if the duration that the identified player has served as the player-banker exceeds one hour, then the wager-based game would be suspended. During the suspension (or implementing the suspension), the gaming apparatus providing the wager-based gaming can be locked down through use of a locking mechanism associated with the gaming apparatus or one or more components thereof. Additionally, if desired, the duration being monitored can also be displayed, such as on a dealer display, player display and/or community display.

The various aspects, features, embodiments or implementations of the invention described above can be used alone or in various combinations.

Embodiments of the invention can, for example, be implemented by software, hardware, or a combination of hardware and software. Embodiments of the invention can also be embodied as computer readable code on a computer readable medium. In one embodiment, the computer readable medium is non-transitory. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

In the foregoing description, reference to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A management system for management of dealers in a gaming establishment, the gaming establishment hosting a plurality of gaming apparatus, each of the gaming apparatus being configured to perform or facilitate a wager based game, and each of the gaming apparatus including or being proximate to a gaming support appliance having an electronic lock integral or proximate thereto, the management system comprising:
a management rules database configured to store a plurality of management rules applicable to a dealer of the gaming apparatus at the gaming establishment; and a dealer management server configured to control the electronic lock of the gaming support appliance of each of the gaming apparatus, the dealer management server being configured to:
identify a set of dealer management rules applicable to the dealer the set of dealer management rules including at least dealer schedule data; determine when operation of the gaming apparatus by the dealer should cease based on at least one or more of the set of dealer management rules; and
initiate automatic activation of the electronic lock of the gaming support appliance, via a gaming appliance controller of the gaming support appliance, for the gaming apparatus being operated by the dealer when it is determined that operation of the gaming apparatus by the dealer should cease.

2. A management system as recited in claim 1, wherein the dealer schedule data pertains to schedule data for the dealers of the gaming apparatus at the gaming establishment.

3. A management system as recited in claim 2, wherein the dealer management server is configured to initiate activation of the electronic lock of the gaming support appliance of the gaming apparatus being operated by the dealer when it is determined that both operation of the gaming apparatus by the dealer should cease and the operation of the gaming apparatus by the dealer is in accordance with the dealer schedule data.

4. A management system as recited in claim 1, wherein the dealer management server is configured to control activation or deactivation of the electronic lock of the gaming support appliance of the gaming apparatus being operated by the dealer.

5. A management system as recited in claim 4, wherein the dealer management server is configured to:
electronically record at least data associated with activation or deactivation of the electronic lock of the gaming support appliance of the gaming apparatus being operated by the dealer.

6. A management system as recited in claim 1, wherein the management system comprises:
a dealer management terminal configured to enable a manager to assign or unassign dealers to different ones of the plurality of gaming apparatus.

7. A management system as recited in claim 1, wherein the management system comprises:
a dealer management terminal configured to (i) enable a manager to assign or unassign dealers to different ones of the plurality of gaming apparatus, and (ii) present notifications to the manager concerning dealer breaks or dealer shift changes.

8. A management system as recited in claim 1, wherein the management system comprises:
a dealer terminal provided at or proximate to at least one of the gaming apparatus and configured to present notifications to the dealer assigned to the at least one of the gaming apparatus, the notifications including at least one notification concerning dealer breaks or dealer shift changes.

9. A management system as recited in claim 1, wherein at least one of the management rules pertains to a regulation imposing a limitation on operation of the gaming apparatus by the dealer.

10. A computer-implemented method for managing dealer operation of a wager-based gaming apparatus, the method comprising:
(a) receiving a dealer login request from a dealer seeking to serve as dealer at the wager-based gaming apparatus;
(b) determining whether the dealer is authenticated;
(c) determining whether operation of the wager-based gaming apparatus by the dealer complies with a management schedule; and
(d) automatically permitting the dealer to serve as dealer of the wager-based gaming apparatus provided that (i)

the determining determines that the dealer is authenticated and (ii) the determining determines that operation of the wager-based gaming apparatus by the dealer complies with a management schedule; and (e) automatically denying the dealer to serve as the dealer of the wager-based gaming apparatus by initiating automatic activation of an electronic lock of one or more gaming support appliances associated with the wager-based gaming apparatus, provided that (i) the determining determines that the dealer is not authenticated or (ii) the determining determines that operation of the wager-based gaming apparatus by the dealer does not comply with a management schedule.

11. A computer-implemented method as recited in claim 10, wherein the permitting (d) comprises initiating automatic unlock of the electronic lock of the one or more gaming support appliances associated with the wager-based gaming apparatus.

12. A computer-implemented method as recited in claim 11, wherein the initiating automatic unlock of the electronic lock comprises causing at least one control signal to be sent to the one or more gaming support appliances.

13. A computer-implemented method as recited in claim 10, wherein the method comprises:

(e) notifying the dealer or a manager of the dealer that operation of the wager-based gaming apparatus by the dealer is denied if the determining (b) determines that the dealer is not successfully authenticated.

14. A computer-implemented method as recited in claim 10, wherein the method comprises:

(e) monitoring, subsequent to the permitting (d), activity of the dealer at least at the wager-based gaming device for which the dealer has been permitted to operate.

15. A computer-implemented method as recited in claim 14, wherein the method comprises:

(f) causing display on a display apparatus an indication to (i) the dealer, (ii) a manager of the dealer, and/or (iii) a player of the wager-based gaming apparatus that operation of the wager-based gaming apparatus by the dealer is due to expire at a time indication.

16. A computer-implemented method as recited in claim 14, wherein the monitoring (e) comprises:

identifying a set of dealer management rules applicable to the dealer; and determining when operation of the wager-based gaming apparatus by the dealer should cease based on at least one or more of the dealer management rules in the set of dealer management rules.

17. A computer-implemented method as recited in claim 16, wherein the method comprises:

(g) notifying (i) the dealer, (ii) a manager of the dealer, and/or (iii) a player of the wager-based gaming apparatus that operation of the wager-based gaming apparatus by the dealer is due to expire at a time indication.

18. A computer-implemented method as recited in claim 14, wherein the monitoring (e) comprises:

initiating automatic lock of the electronic lock of the one or more gaming support appliances associated with the wager-based gaming apparatus.

19. A computer-implemented method as recited in claim 14, wherein the permitting (d) comprises initiating automatic unlock of the electronic lock of the one or more gaming support appliances associated with the wager-based gaming apparatus, and wherein the monitoring (e) comprises:

initiating automatic lock of the electronic lock of the one or more gaming support appliances associated with the wager-based gaming apparatus.

20. A computer readable non-transitory medium including at least computer program code tangibly stored therein for managing dealer operation of a wager-based gaming apparatus, the computer readable medium comprising:

computer program code for receiving a dealer login request from a dealer seeking to serve as dealer at the wager-based gaming apparatus;

computer program code for determining whether the dealer is authenticated;

computer program code for determining whether operation of the wager-based gaming apparatus by the dealer complies with a management schedule; computer program code for permitting the dealer to serve as dealer of the wager-based gaming apparatus provided that the computer program code for determining determines that the dealer is authenticated and provided that the computer program code for determining determines that operation of the wager-based gaming apparatus by the dealer complies with a management schedule; and computer program code for automatically denying the dealer to serve as the dealer of the wager-based gaming apparatus initiating automatic activation of an electronic lock of one or more gaming support appliances associated with the wager-based gaming apparatus provided that the computer program code for determining determines that the dealer is not authenticated or that the computer program code for determining determines that operation of the wager-based gaming apparatus by the dealer does not comply with a management schedule.

* * * * *